(12) United States Patent
Maeda et al.

(10) Patent No.: US 9,158,924 B2
(45) Date of Patent: Oct. 13, 2015

(54) INFORMATION PROCESSING APPARATUS AND INFORMATION PROCESSING METHOD

(75) Inventors: Manabu Maeda, Osaka (JP); Teruto Hirota, Osaka (JP); Hideki Matsushima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 316 days.

(21) Appl. No.: 13/808,178

(22) PCT Filed: May 2, 2012

(86) PCT No.: PCT/JP2012/002965
§ 371 (c)(1),
(2), (4) Date: Jan. 3, 2013

(87) PCT Pub. No.: WO2012/160760
PCT Pub. Date: Nov. 29, 2012

(65) Prior Publication Data
US 2013/0111605 A1    May 2, 2013

(30) Foreign Application Priority Data
May 25, 2011    (JP) .................................. 2011-117255

(51) Int. Cl.
  *H04L 29/06* (2006.01)
  *G06F 21/60* (2013.01)
  (Continued)

(52) U.S. Cl.
  CPC .............. *G06F 21/60* (2013.01); *G06F 12/126* (2013.01); *G06F 21/10* (2013.01); *G06F 21/14* (2013.01); *G06F 21/78* (2013.01); *G06F 2221/2105* (2013.01); *G06F 2221/2143* (2013.01)

(58) Field of Classification Search
  CPC ............ G06F 12/0866; G06F 12/0868; G06F 12/0873; G06F 3/00
  USPC .......... 711/3, 5, 100, 113, 118–126, 145, 152
  See application file for complete search history.

(56) References Cited

U.S. PATENT DOCUMENTS 5,678,026 A * 10/1997 Vartti et al. .................... 711/152
5,982,887 A    11/1999 Hirotani
(Continued)

FOREIGN PATENT DOCUMENTS

EP    1 073 051 A2    1/2001
EP    2 357 587 A2    8/2011
(Continued)

OTHER PUBLICATIONS

International Search Report issued Jul. 31, 2012 in International (PCT) Application No. PCT/JP2012/002965.
(Continued)

*Primary Examiner* — Joseph P Hirl
*Assistant Examiner* — Leynna Truvan
(74) *Attorney, Agent, or Firm* — Wenderoth, Lind & Ponack, L.L.P.

(57) ABSTRACT

An information processing apparatus that processes data to be protected is provided. The information processing apparatus includes a first storage unit, a second storage unit, and a cache control unit configured to cache data stored in the first storage unit into the second storage unit. The cache control unit is configured to lock a cache region in the second storage unit to thereby prevent cache data of the stored data from being written back into the first storage unit, the cache data being obtainable from the cache region in the second storage unit in which the stored data is cached, and write the data to be protected different from the stored data into the cache region in the second storage unit, after the cache region in the second storage unit is locked.

18 Claims, 17 Drawing Sheets

(51) Int. Cl.
*G06F 12/12* (2006.01)
*G06F 21/78* (2013.01)
*G06F 21/10* (2013.01)
*G06F 21/14* (2013.01)

(56) References Cited

U.S. PATENT DOCUMENTS

| | | |
|---|---|---|
| 7,117,284 B2 | 10/2006 | Watt et al. |
| 7,124,274 B2 | 10/2006 | Watt et al. |
| 7,149,862 B2 | 12/2006 | Tune et al. |
| 7,171,539 B2 | 1/2007 | Mansell et al. |
| 7,185,159 B2 | 2/2007 | Beinet et al. |
| 7,231,476 B2 | 6/2007 | Watt et al. |
| 7,305,534 B2 | 12/2007 | Watt et al. |
| 7,305,712 B2 | 12/2007 | Watt et al. |
| 7,325,083 B2 | 1/2008 | Watt et al. |
| 7,340,573 B2 | 3/2008 | Watt |
| 7,370,210 B2 | 5/2008 | Symes |
| 7,383,587 B2 | 6/2008 | Watt et al. |
| 7,448,050 B2 | 11/2008 | Watt et al. |
| 7,487,367 B2 | 2/2009 | Belnet et al. |
| 7,539,853 B2 | 5/2009 | Orion et al. |
| 7,590,869 B2 | 9/2009 | Hashimoto |
| 7,661,104 B2 | 2/2010 | Watt et al. |
| 7,661,105 B2 | 2/2010 | Watt et al. |
| 7,849,296 B2 | 12/2010 | Watt et al. |
| 7,849,310 B2 | 12/2010 | Watt et al. |
| 7,949,866 B2 | 5/2011 | Watt et al. |
| 8,082,589 B2 | 12/2011 | Orion et al. |
| 8,086,829 B2 | 12/2011 | Orion et al. |
| 2004/0105298 A1 | 6/2004 | Symes |
| 2004/0139346 A1 | 7/2004 | Watt et al. |
| 2004/0143714 A1 | 7/2004 | Watt |
| 2004/0143720 A1 | 7/2004 | Mansell et al. |
| 2004/0148480 A1 | 7/2004 | Watt et al. |
| 2004/0153593 A1 | 8/2004 | Watt et al. |
| 2004/0153672 A1 | 8/2004 | Watt et al. |
| 2004/0153807 A1 | 8/2004 | Watt et al. |
| 2004/0158727 A1 | 8/2004 | Watt et al. |
| 2004/0158736 A1 | 8/2004 | Watt et al. |
| 2004/0163013 A1 | 8/2004 | Watt et al. |
| 2004/0170046 A1 | 9/2004 | Belnet et al. |
| 2004/0177261 A1 | 9/2004 | Watt et al. |
| 2004/0177269 A1 | 9/2004 | Belnet et al. |
| 2004/0181682 A1 | 9/2004 | Orino et al. |
| 2004/0187117 A1 | 9/2004 | Orion et al. |
| 2004/0260910 A1 | 12/2004 | Watt et al. |
| 2005/0105738 A1 | 5/2005 | Hashimoto |
| 2005/0114616 A1 | 5/2005 | Tune et al. |
| 2005/0160210 A1 | 7/2005 | Watt et al. |
| 2007/0118693 A1* | 5/2007 | Brannon et al. ............ 711/118 |
| 2008/0052537 A1 | 2/2008 | Nishizono |
| 2009/0177830 A1 | 7/2009 | Orion et al. |
| 2009/0259846 A1 | 10/2009 | Watt et al. |
| 2009/0320048 A1 | 12/2009 | Watt et al. |

FOREIGN PATENT DOCUMENTS

| | | |
|---|---|---|
| JP | 2003-167783 | 6/2003 |
| JP | 2004-288155 | 10/2004 |
| JP | 2005-99984 | 4/2005 |
| JP | 2008-52360 | 3/2008 |
| WO | 2007/035714 A2 | 3/2007 |

OTHER PUBLICATIONS

"ARM Security Technology, Building a Secure System using TrustZone® Technology", http://infocenter.arm.com/help/topic/com.arm.doc.prd29-genc-009492c/PRD29-GENC-00949C__trustzone__security__whitepaper.pdf (Revision C: Apr. 2009).

Extended European Search Report issued Apr. 14, 2015, in corresponding European Application No. 12789427.7.

* cited by examiner

INFORMATION PROCESSING APPARATUS AND INFORMATION PROCESSING METHOD

TECHNICAL FIELD

The present invention relates to an information processing apparatus that processes data to be protected.

BACKGROUND OF INVENTION

Background Art

Various information processing apparatuses that process data to be protected have thus far been developed. For example, Patent Literature (PTL) 1 and Non Patent Literature (NPL) 1 disclose techniques applicable to the information processing apparatuses.

CITATION LIST

Patent Literature

[PTL 1] Japanese Unexamined Patent Application Publication No. 2004-288155

Non Patent Literature

[NPL 1] ARM Security Technology (http://infocenter.arm.com/help/topic/com.arm.com.prd29-genc-009492c/PRD29-GENC-009492C_trustzone_security_whitepaper.pdf)

SUMMARY OF INVENTION

With the conventional information processing apparatuses, however, protection of the data to be protected may not always be sufficient.

Accordingly, an object of the present invention is to provide an information processing apparatus capable of effectively protecting the data to be protected.

In an aspect, the present invention provides an information processing apparatus that processes data to be protected. The information processing apparatus includes a first storage unit, a second storage unit, and a cache control unit configured to cache data stored in the first storage unit into the second storage unit. The cache control unit is configured to (i) lock a cache region in the second storage unit to thereby prevent cache data of the stored data from being written back into the first storage unit, the cache data being obtainable from the cache region in the second storage unit in which the stored data is cached, and (ii) write the data to be protected different from the stored data into the cache region in the second storage unit, after the cache region in the second storage unit is locked.

The aforementioned constituents may be realized, generally or specifically, in a form of a system, a method, an integrated circuit, a computer program, or a recording medium, or any desired combination thereof.

The information processing apparatus configured as above is capable of effectively protecting data to be protected when processing the data to be protected.

DETAILED DESCRIPTION OF INVENTION

Figure 1:
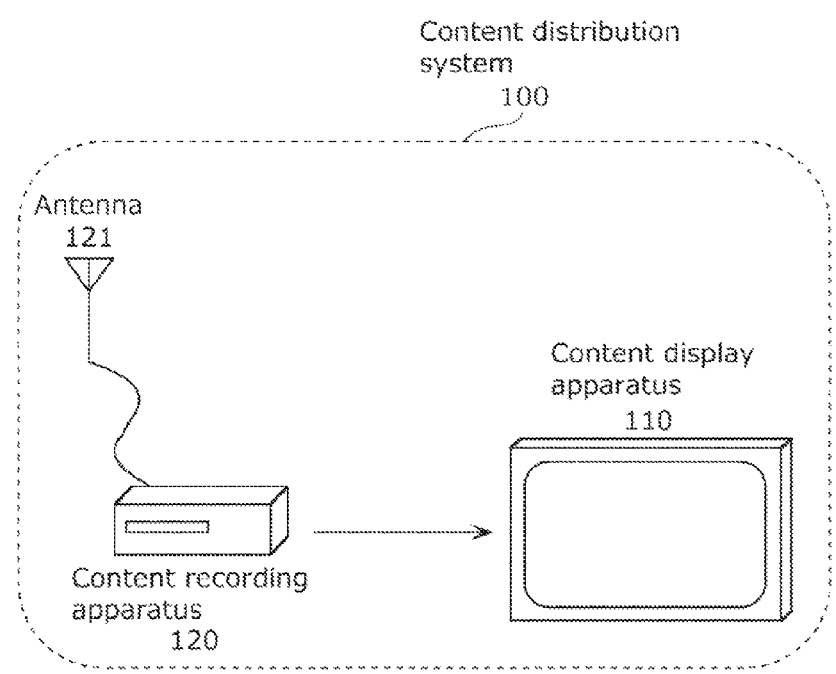
FIG. 1 is a schematic drawing showing an overall configuration of a content distribution system according to Embodiment 1.

Findings Constituting the Basis of Present Invention

It is not desirable that a program for managing copyright is subjected to an illegitimate act such as unauthorized analysis. Accordingly, techniques for protecting such a program (hereinafter, "program to be protected") are widely employed. That is because not only the right holder of the program but broadly various parties concerned may suffer losses from insufficient protection.

For example, if a wrongdoer can illegitimately analyze and falsify a program for decrypting an encrypted digital content and playing back that content, the digital content may be illegitimately utilized.

More specifically, the wrongdoer may illegitimately analyze the program for decrypting the encrypted digital content and acquire the decryption key for decrypting the digital content, to thereby illegitimately play back the digital content. Further, even though the number of copying times or the number of playback times of the digital content is restricted, the wrongdoer may falsify the program for checking the number of copying times or the number of playback times of the digital content, so as to invalidate the restriction.

NPL 1 discloses a technique for protecting data such as a program from unauthorized analysis by a wrongdoer. The technique according to NPL 1 includes forming a secure domain having a mechanism that rejects an unauthorized access from outside. A large scale integration (LSI) employed in this technique is configured to operate in a secure mode in which processing is performed in a secure domain or in a normal mode in which processing is performed outside of the secure domain, and to switch between the secure mode and the normal mode.

With such a technique, the program to be protected can be protected from unauthorized analysis by operating the program in the secure mode. Therefore, a decryption key for decrypting the program can be protected from illegitimate acquisition and, for example, a program for checking the number of playback times can be protected from falsification.

To be more detailed, in the mechanism that rejects an unauthorized access, a signal called non-secure (NS) bit is provided to a bus connecting between a processor and peripheral circuits in the LSI. The NS-bit is set to be High when the processor core is operating in the normal mode, and set to be Low when the processor core is operating in the secure mode.

Then the peripheral circuits connected to the bus, such as a memory control unit (memory controller), a cache, and a DMA control unit (DMA controller) perform access control according to the NS-bit. For example, the memory control unit sets the NS-hit for each of memory regions of a predetermined size, for instance 4 KB. When the processor core accesses the memory, the memory control unit compares the value of the NS-bit of the bus with the NS-bit of the memory, to thereby perform the access control More specifically, when the processor core is operating in the normal mode (NS-bit of the bus is High) and attempts to access the memory region allocated to the secure mode, where the NS-bit of the memory is Low, the memory control unit rejects the access. In contrast, the memory control unit permits an access otherwise made.

An information processing apparatus can restrict the programs being operated in the normal mode from accessing the secure memory region and functions set to be performed only in the secure mode, by utilizing the unauthorized access rejecting mechanism. More specifically, the information processing apparatus can store the decryption key for decrypting the program in the memory region allocated to the secure mode, perform the decryption in the secure mode, and check the number of playback times in the secure mode. The information processing apparatus can thus prevent unauthorized analysis and falsification by a wrongdoer.

The technique according to NPL 1 is, however, simply designed to perform the access control to the programs and to prevent unauthorized analysis and falsification by an attacker program, on the premise that both the processor core and the peripheral circuits correctly handle the NS-bit. Accordingly, in the case where a program executed in the LSI is designed to utilize an external memory such as an SDRAM, the technique according to NFL 1 is unable to prevent an attack to a signal line connecting between the LSI and the external memory.

For example, a wrongdoer may utilize an oscilloscope or a logic analyzer to capture (probe) data running on the signal line, to thereby directly acquire the data to be written in the secure memory region. Further, the wrongdoer may analyze the acquired data so as to acquire a key protecting the digital content, thus to illegitimately copy the digital content.

It is therefore desirable that the information processing apparatus has the capability to effectively protect data from such an attack, more particularly from data theft committed by probing a signal line with hardware such as a logic analyzer.

Accordingly, an aspect of the present invention provides an information processing apparatus that processes data to be protected, the information processing apparatus including a first storage unit, a second storage unit, and a cache control unit configured to cache data stored in the first storage unit into the second storage unit. The cache control unit is configured to (i) lock a cache region in the second storage unit to thereby prevent cache data of the stored data from being written back into the first storage unit, the cache data being obtainable from the cache region in the second storage unit in which the stored data is cached, and (ii) write the data to be protected different from the stored data into the cache region in the second storage unit, after the cache region in the second storage unit is locked.

Under such a configuration, the data to be protected is written in the cache region (second storage unit) in the memory provided for caching the data, not in the memory (first storage unit) such as an SDRAM. Accordingly, it is difficult for an external apparatus to access the data written in the cache. In addition, since the data to be protected is written in the cache region which is locked, the data cannot be written back into the memory. Therefore, the data to be protected can be effectively protected.

For example, the cache control unit may be configured to write the data to be protected outputted from a processor in the cache region of the second storage unit, through a circuit physically protected to restrict an external apparatus from acquiring the data to be protected outputted from the processor, and the second storage unit may be physically protected to restrict an external apparatus from acquiring the data to be protected written in the cache region.

Such an arrangement makes it physically difficult for an external apparatus to acquire the data to be protected. Accordingly, the data to be protected can be effectively protected.

For example, the cache control unit may be configured to, when the data to be protected is processed, (i) allocate a data region in the first storage unit for the data to be protected, (ii) cache the stored data in the allocated data region in the second storage unit, (iii) lock the cache region in the second storage unit, to thereby restrict the cache data of the stored data from being written back in the first storage unit, the cache data being obtainable from the cache region in the second storage unit where the stored data is cached, and (iv) write the data to be protected different from the stored data in the cache region in the second storage unit, after the cache region in the second storage unit is locked.

With such an arrangement, the data region for the data to be protected is allocated in the memory, when the data to be protected is processed. Accordingly, appropriate correspondence can be maintained between the region in the memory and the cache region.

For example, the cache control unit may be configured to clear the cache region in the second storage unit after the data to be protected is processed, and unlock the cache region so as to allow the cache data obtainable from the cleared cache region to be written back in the first storage unit.

With such an arrangement, the data to be protected is erased before being written back in the memory from the cache. Accordingly, the data to be protected can be effectively protected.

For example, the information processing apparatus may further include a processor that generates the data to be protected and outputs the generated data to be protected, and the cache control unit may be configured to write the data to be protected outputted from the processor in the cache region in the second storage unit, after the cache region in the second storage unit is locked.

Such a configuration enables the data to be protected generated by the processor to be written in the cache, thereby effectively protecting the data to be protected generated by the processor.

For example, the information processing apparatus may further include an integrated circuit, and the second storage unit, the cache control unit, and the processor may be included in the integrated circuit.

In this case, the cache and the processor constitute a single integrated circuit. It is difficult for an external apparatus to access data in an integrated circuit. Therefore, the data to be protected can be effectively protected.

For example, the processor may generate the data to be protected by decrypting encrypted data, and output the generated data to be protected.

Such an arrangement enables the data to be protected generated by decrypting the encrypted data to be effectively protected.

For example, the cache control unit may be configured to write, in the cache region in the second storage unit, the data to be protected scheduled by a program to be written in the first storage unit.

In this case, the data to be protected to be written in the memory by the program is written in the cache instead of in the memory. Accordingly, the data to be protected can be effectively protected.

For example, the cache control unit may be configured to write an executable program in the cache region in the second storage unit, as the data to be protected.

Such an arrangement protects the program to be protected from falsification, thereby allowing the program to be properly executed.

For example, the processor may execute a secure program in the secure mode and a normal program in the normal mode, and the first storage unit may include a first storage region in which the normal program is to be stored and a second storage region in which the secure program is to be stored and an access to which by the normal program is restricted.

Such a configuration allows the programs to be executed under the appropriate security level, thereby enabling the access control to be executed on the basis of the security level corresponding to the program.

For example, the cache control unit may be configured to write, in the cache region in the second storage unit, the data to be protected scheduled by the secure program to be written in the second storage region.

In this case, the data to be protected to be written in the memory by the secure program is written in the cache instead of the memory. Accordingly, the data to be protected can be protected at a higher security level.

For example, the information processing apparatus may further include an access control unit configured to restrict the normal program from accessing the second storage region.

Such a configuration enables the access to a plurality of storage regions in the memory to be appropriately controlled, thereby effectively restricting execution of an illegitimate program.

Further, general or specific forms of the aforementioned configurations may be realized by a system, a method, an integrated circuit, a computer program, or a recording medium, or by a desired combination thereof.

Hereafter, the information processing apparatus according to embodiments of the present invention will be described in detail, referring to the drawings.

The following embodiments represent preferred examples of the present invention. Constituents, positions thereof and relationships therebetween, processes, and sequences thereof described in the embodiments are merely exemplary, and in no way intended to limit the present invention. The constituents described in the embodiments but not set forth in independent claims representing the most superordinate concept of the present invention are to be construed as optional constituents.

Embodiment 1

The information processing apparatus according to this embodiment is a content display apparatus that receives content from a content recording apparatus that records a broadcast wave received through an antenna, and displays the received content.

[Configuration of Content Distribution System]

FIG. 1 is a schematic drawing showing an overall configuration of a content distribution system according to this embodiment. As shown in FIG. 1, the content distribution system 100 includes a content display apparatus 110, a content recording apparatus 120, and an antenna 121.

The content display apparatus 110 corresponds to the information processing apparatus according to this embodiment. The content display apparatus 110 is connected to the content recording apparatus 120 through a network. The content display apparatus 110 receives the content recorded in the content recording apparatus 120 and displays the received content.

The content recording apparatus 120 is connected to the antenna 121. The content recording apparatus 120 records therein the content received through the antenna 121. The content recording apparatus 120 also transmits the recorded content to the content display apparatus 110, in response to a request therefrom. The content recording apparatus 120 may read out the content from a portable recording medium, and transmit the read-out content to the content display apparatus 110.

The content display apparatus 110 and the content recording apparatus 120 each possess a common encryption/decryption key. The content recording apparatus 120 encrypts the content with the encryption/decryption key, and transmits the encrypted content to the content display apparatus 110. Accordingly, the content can be prevented from being illegitimately acquired by capturing data on the network connecting the content display apparatus 110 and the content recording apparatus 120.

The encryption/decryption key shared by the content display apparatus 110 and the content recording apparatus 120 has to be properly protected. The encryption/decryption key may leak unless the key is protected not only from an attack by software utilizing a debugger or an illegitimate application, but also from an attack by hardware such as a bus probe.

In the case where the encryption/decryption key and the encrypted content on the network are acquired by a third party, the content may be illegitimately decrypted. Accordingly, it is desirable that the encryption/decryption key is properly protected inside the content display apparatus 110 also, as secret data.

[Hardware Configuration of Content Display Apparatus 110]

Figure 2:
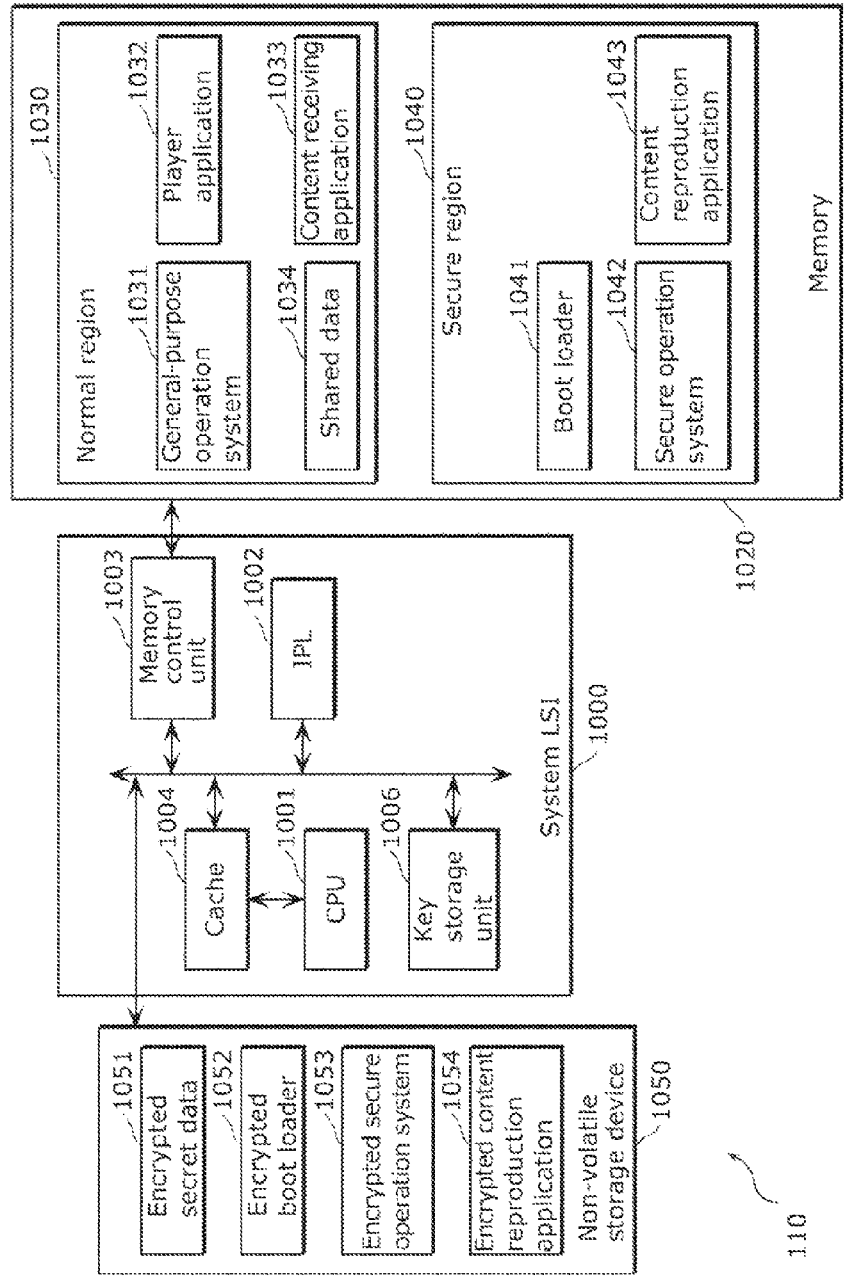
FIG. 2 is a block diagram showing a hardware configuration of a content display apparatus according to Embodiment 1.

FIG. 2 is a block diagram showing a hardware configuration of the content display apparatus 110 shown in FIG. 1. As shown in FIG. 2, the content display apparatus 110 includes a system LSI 1000, a memory 1020, and a non-volatile storage device 1050.

The system LSI 1000 includes a central processing unit (CPU) 1001, an initial program loader (IPL) 1002, a memory control unit (memory controller) 1003, a cache 1004, and a key storage unit 1006.

The CPU 1001 executes command codes contained in a general-purpose operation system (general-purpose OS) 1031 or a player application 1032 stored in the memory 1020. With such execution, the CPU 1001 controls the overall operation of the content display apparatus 110. The CPU 1001 also possesses two modes, namely a secure mode and a normal mode.

A boot loader 1041, a secure operation system (secure OS) 1042, and a content playback application 1043 are set to operate in the secure mode. A program operating in the secure mode can access both a memory region (secure region 1040) utilized by programs of the secure mode and a memory region (normal region 1030) utilized by programs of the normal mode. In addition, the program operating in the secure mode can utilize peripheral circuits such as an encryption engine available in the secure mode.

On the other hand, the general-purpose operation system 1031, the player application 1032, and a content receiving application 1033 are set to operate in the normal mode. A program operating in the normal mode can access the normal region 1030 utilized by the programs of the normal mode, but not to the secure region 1040 utilized by the programs of the secure mode.

The secure mode and the normal mode each include two modes, namely a privilege mode and a non-privilege mode. The boot loader 1041, the secure operation system 1042, and the general-purpose operation system 1031 are set to operate in the privilege mode, and can freely access various resources such as the memory 1020, a network I/F, and an input/output (hereinafter, I/O) I/F.

In contrast, the content playback application 1043 is set to operate in the non-privilege mode, and can access resources designated by the secure operation system 1042. The player application 1032 and the content receiving application 1033 are set to operate in the non-privilege mode, and can access resources designated by the general-purpose operation system 1031.

The CPU 1001 outputs an NS-bit signal when accessing the peripheral circuits such as the memory control unit 1003. The CPU 1001 sets the NS-bit at the Low level when the CPU 1001 is operating in the secure mode. In contrast, when the CPU 1001 is operating in the normal mode, the CPU 1001 sets the NS-bit at the High level. The peripheral circuits connected to the bus, such as the memory control unit 1003, perform access control according to the state of the NS-bit.

The IPL 1002 is the program first activated when the content display apparatus 110 is turned on. The IPL 1002 performs initial setting of the hardware such as the bus, the memory control unit 1003, the memory 1020, and the non-volatile storage device 1050. For performing the initial setting, the IPL 1002 unfolds and executes the boot loader 1041 in the memory 1020. The IPL 1002 is stored for example in a mask ROM in the system LSI 1000, so as not to be subjected to falsification.

The memory control unit 1003, also called memory controller, controls access to the memory 1020 from other circuits connected to the bus. The memory control unit 1003 individually controls each of the two regions in the memory 1020, namely the normal region 1030 and the secure region 1040.

When the CPU 1001 is operating in the normal mode (NS-bit is High) and attempts to access the secure region 1040, the memory control unit 1003 inhibits the access. In contrast, when the CPU 1001 is operating in the normal mode (NS-bit is High) and attempts to access the normal region 1030, the memory control unit 1003 permits the access.

When the CPU 1001 is operating in the secure mode (NS-bit is Low) and attempts to access the normal region 1030 or the secure region 1040, the memory control unit 1003 permits the access.

When the CPU 1001 attempts to access the memory 1020, the cache 1004 reads thereinto data of a predetermined size in the memory 1020, including the data which the CPU 1001 is attempting to access. Then the cache 1004 returns the data to the CPU 1001 in the case where the CPU 1001 is attempting to read the data, and rewrites the data read into the cache 1004 in the case where the CPU 1001 is attempting to write the data.

In this process, in the case where the data in the memory 1020 which the CPU 1001 is attempting to access has already been read into the cache 1004, the cache 1004 does not read the data from the memory 1020 but handles the data stored in the cache 1004. Such an arrangement increases the access speed when the CPU 1001 accesses continuous data in the memory 1020.

The cache 1004 overwrites data newly read thereinto on the stored data, when the region in the cache 1004 for storing data is filled up.

In the case where the CPU 1001 is attempting to write data, the cache 1004 updates the data stored therein and reflects the updated data to the memory 1020 at an appropriate time point. Such reflection to the memory 1020 may be performed either by a write-through algorithm or a write-back algorithm.

With the write-through algorithm, the updated data is reflected to the memory 1020 simultaneously with the updating of the data in the cache 1004 performed when the CPU 1001 attempts to write the data.

With the write-back algorithm, first the data in the cache 1004 is updated when the CPU 1001 attempts to write the data. Then the updating is reflected to the memory 1020 immediately before another data newly read into the cache 1004 is overwritten on the updated data in the cache 1004.

In this embodiment, the write-back algorithm is adopted when the cache 1004 reflects the updating, so as to prevent the secret data from being written in the memory 1020.

It is desirable that the cache 1004 is capable of instantaneously search, upon receipt of a data access request from the CPU 1001, whether that data is present in the cache 1004. Accordingly, the cache 1004 stores data therein in a special data structure.

For example, the cache 1004 manages the data stared therein in units of a certain size called "line". More specifically, the cache 1004 defines a storage location in the cache 1004 of the data to be stored therein, on the basis of lower bits (hereinafter, set index) of the address of the data in the memory 1020.

In each line, a portion of the address except the set index (tag) and the data are stored. The cache 1004 identifies in which position of the memory 1020 the data stored in the line is located, on the basis of the storage position in the line and the tag information.

The cache 1004 can store a plurality of tags and data in storage locations having the same set index. Each of such storage locations is called "way". A cache capable of storing four tags and four pieces of data is called "4-way cache".

The cache 1004 also stores, when reading thereinto the data in the memory 1020, the information for identifying in which of the normal region 1030 or the secure region 1040 the data has been stored (NS-bit), together with the data.

When the cache 1004 reads data from the normal region 1030, the cache 1004 records the NS-bit of High level together with the data. When the cache 1004 reads data from the secure region 1040, the cache 1004 records the NS-bit of Low level together with the data. When the CPU 1001 attempts to access the cache 1004, the cache 1004 looks up, like the memory control unit 1003, the mode of the CPU 1001 and the NS-bit value recorded together with the data, to thereby perform the access control.

To be more detailed, when the CPU 1001 is operating in the normal mode, the cache 1004 inhibits the access of the CPU 1001 to cache data having the NS-bit of Low level (data read from the secure region 1040), and permits the access to data not read from the secure region 1040.

The cache 1004 includes data, the address of the data, a Dirty flag, and a Valid flag. The data is read from the memory 1020. The address corresponds to the address of the data in the memory 1020. The Dirty flag is set when data in the cache 1004 is rewritten. The Valid flag indicates that valid data is stored in the cache 1004.

The key storage unit 1006 possesses an encryption/decryption key. The encryption/decryption key is used for decryption of encrypted secret data 1051, an encrypted boot loader 1052, an encrypted secure operation system 1053, and an encrypted content playback application 1054. The encryption/decryption key is also used for encryption of the secret data, the boot loader 1041, the secure operation system 1042 and the content playback application 1043 that are decrypted.

The encryption/decryption key may further be used for encryption or decryption of other data. Further, the encryption/decryption key may be used for encryption or decryption of another key used for encryption or decryption of data and programs.

The key storage unit 1006 may possess a plurality of encryption/decryption keys utilized for a plurality of programs. The key storage unit 1006 may also possess an encryption key and a decryption key that are different from each other, made up on the basis of public key cryptography. Alternatively, the key storage unit 1006 may possess a common encryption/decryption key made up on the basis of the common key cryptography.

The memory 1020 is a volatile random-access memory (RAM and includes the normal region 1030 and the secure region 1040.

In the normal region 1030, programs to be executed by the CPU 1001 in the normal mode are stored. Specifically, the general-purpose operation system 1031, the player application 1032, and the content receiving application 1033 are stored in the normal region 1030. In addition, shared data 1034, which both the normal mode and programs to be executed in the secure mode can access, is stored in the normal region 1030.

In the secure region 1040, programs to be executed by the CPU 1001 in the secure mode are stored. Specifically, the boot loader 1041, the secure operation system 1042, and the content playback application 1043 are stored in the secure region 1040.

The CPU 1001 can access the normal region 1030 both when the CPU 1001 is operating in the secure mode and in the normal mode. When the CPU 1001 is operating in the secure mode, the CPU 1001 can access the secure region 1040. However, the CPU 1001 is not permitted to access the secure region 1040 when operating in the normal mode. Such access control is performed by the memory control unit 1003.

Here, in an environment where an application is not to be installed by a user, a debugger or an illegitimate application cannot be installed either. Accordingly, it is not necessary to distinguish between the normal region 1030 and the secure region 1040, under such an environment. In addition, all the processings may be performed in the normal mode.

The non-volatile storage device 1050 is constituted of a flash memory or the like, and installed inside the content display apparatus 110. The non-volatile storage device 1050 includes the encrypted secret data 1051, the configuration of which will be subsequently described. In addition, the encrypted boot loader 1052, the encrypted secure operation system 1053, the encrypted content playback application 1054, and other secure application (not shown) stored in the memory 1020 are stored in the non-volatile storage device 1050.

The non-volatile storage device 1050 may further contain applications such as the player application 1032, the content receiving application 1033, and the content playback application 1043. The programs stored in the secure region 1040 are encrypted, like the encrypted boot loader 1052, the encrypted secure operation system 1053, and the encrypted content playback application 1054, when stored in the non-volatile storage device 1050. The structure of the encrypted program will be subsequently described.

The content display apparatus 110 further includes input/output terminals and so forth, which are not shown in FIG. 2. They are, however, not essential in this disclosure and hence the description thereof will not be made. In addition, although the system LSI 1000 includes peripheral circuits and so forth which are not shown in FIG. 2, they are not essential either and hence the description thereof will not be made.

[Hardware Configuration of Cache 1004]

Figure 3:
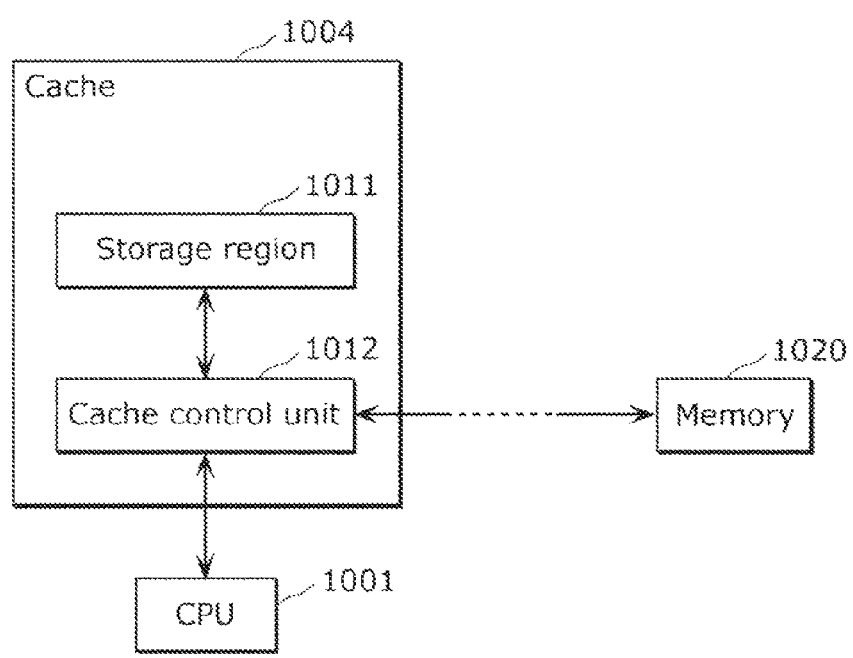
FIG. 3 is a block diagram showing a configuration of a cache according to Embodiment 1.

FIG. 3 is a block diagram showing the configuration of the cache 1004 shown in FIG. 2. As shown in FIG. 3, the cache 1004 includes a storage 1011 and a cache control unit (cache DMA controller) 1012.

The storage 1011 serves as the region to store therein data stored in the memory 1020. In other words, the data stored in the memory 1020 is cached in the storage 1011.

The cache control unit 1012, also called cache DMA controller, controls the operation of the cache 1004. For example, the cache control unit 1012 caches the data stored in the memory 1020 in the storage 1011 of the cache 1004.

More specifically, the cache control unit 1012 transmits the data cached in the storage 1011 to the CPU 1001, upon receipt of a data request therefrom. In the case where the requested data is not cached in the storage 1011, the cache control unit 1012 caches the data stored in the memory 1020 in the storage 1011, through the memory control unit 1003. After that, the cache control unit 1012 transmits the data cached in the storage 1011 to the CPU 1001.

Here, the configuration shown in FIG. 3 is merely an example. The cache control unit 1012 may be, for example, a component independent from the cache 1004. In addition, the cache 1004 may be an L2 cache (level-2 cache), an L1 cache (level-1 cache), or a different cache.

[Software Configuration of Content Display Apparatus 110]

Figure 4:
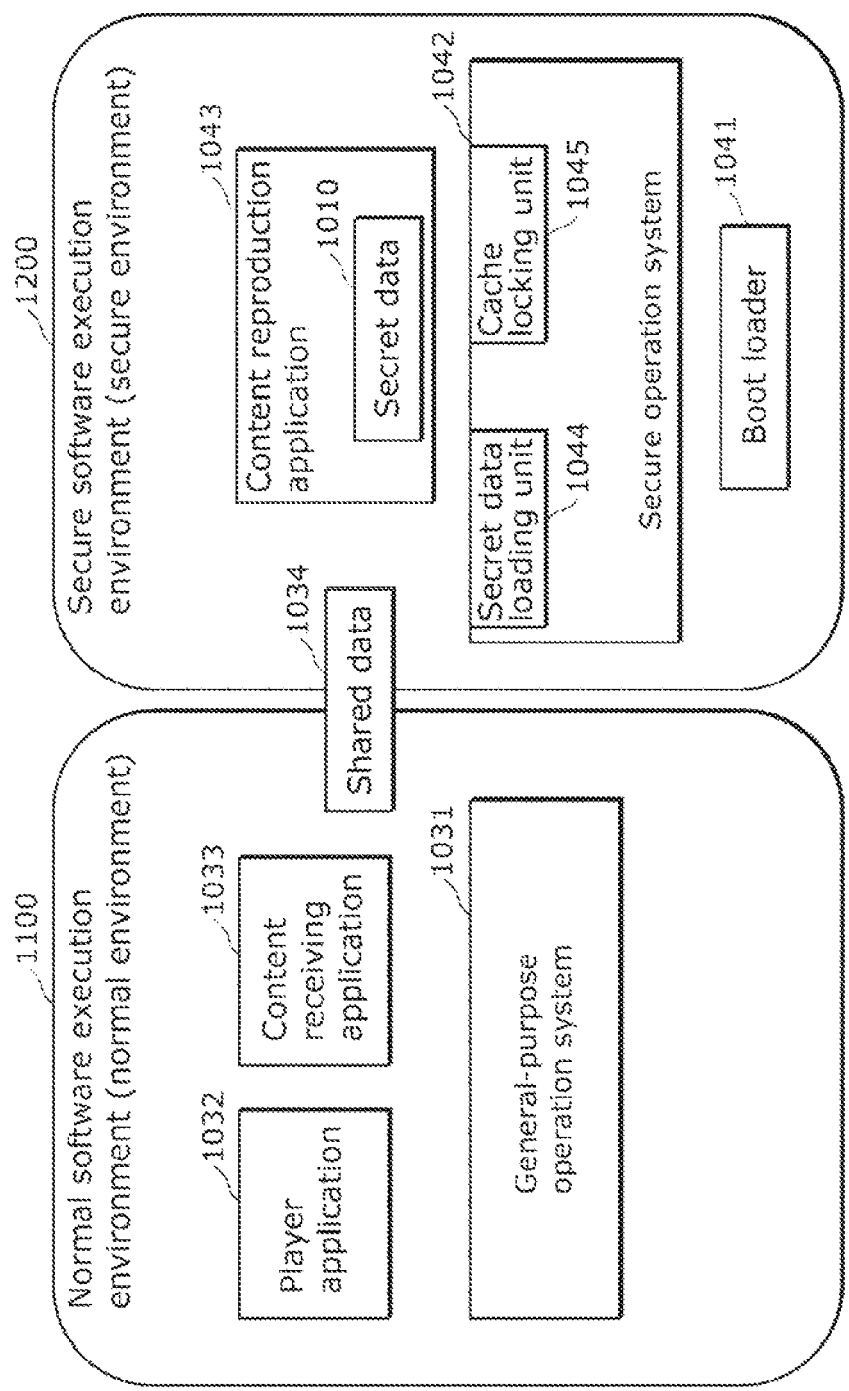
FIG. 4 is a block diagram showing a software configuration of the content display apparatus according to Embodiment 1.

FIG. 4 is a block diagram showing the software configuration of the content display apparatus 110 shown in FIG. 1. As shown in FIG. 4, the content display apparatus 110 includes a normal software execution environment (hereinafter, normal environment or normal world) 1100 and a secure software execution environment (hereinafter, secure environment or secure world) 1200.

The content display apparatus 110 switches between the normal environment 1100 and the secure environment 1200, when executing programs. Here, for example the process according to PTL 1 may be employed for switching between the normal environment 1100 and the secure environment 1200.

[Software Configuration of Normal Environment 1100]

The normal environment 1100 includes the general-purpose operation system 1031, the player application 1032, the content receiving application 1033, and the shared data 1034.

The general-purpose operation system 1031 manages the applications that operate in the normal environment 1100, such as the player application 1032 and the content receiving application 1033. The general-purpose operation system 1031 also performs access management and resource management, when the application operating in the normal environment 1100 utilizes hardware in the network and so forth.

The player application 1032 serves to control playback of content, and provides the user with the interface for selecting, playing back, or stopping the content. The player application 1032 also outputs an instruction to the content receiving application 1033 and the content playback application 1043 when the user requests the playback of the content. The content receiving application 1033 receives the content from the content recording apparatus 120, and the content playback application 1043 plays back the received content.

The content receiving application 1033 receives, upon receipt of a request for the content from the player application 1032, the requested content from the content recording apparatus 120 through the network.

The normal environment 1100 may further include other applications not shown in FIG. 4.

[Software Configuration of Secure Environment 1200]

The secure environment 1200 includes the boot loader 1041, the secure operation system 1042, and the content playback application 1043.

The boot loader 1041 is activated by the IPL 1002 when the content display apparatus 110 is turned on. Then the boot loader 1041 performs initialization of the secure environment 1200, setting of the secure region 1040, and loading of the secure operation system 1042 in the memory 1020.

The secure operation system 1042 manages the secure applications that operate in the secure environment 1200, such as the content playback application 1043 and so forth. The secure operation system 1042 also loads the secure app cation in the secure region 1040, when the secure application is activated. The secure operation system 1042 thus protects the secure application from the applications operating in the normal environment 1100.

The secure operation system 1042 further includes a secret data loading unit 1044 and a cache locking unit 1045.

For example, the content playback application 1043, which is a secure application, requests the secure operation system 1042 to load the encrypted secret data 1051 recorded in the non-volatile storage device 1050, as the secret data 1010. The secure operation system 1042 requests the cache locking unit 1045 to lock the region in the cache 1004 where the secret data 1010 is to be loaded.

Then the secure operation system 1042 requests the secret data loading unit 1044 to load the encrypted secret data 1051 as the secret data 1010. With such a procedure, the secret data 1010 loaded in the cache 1004 is restricted from being written out into the memory 1020.

The secret data loading unit 1044 decrypts and verifies the encrypted secret data 1051 recorded in the non-volatile storage device 1050, in accordance with the request from the secure operation system 1042. The secret data loading unit 1044 then loads the secret data 1010 in a designated region. In addition, the secret data loading unit 1044 calculates a verification value of the secret data 1010, and encrypts the secret data 1010 to thereby generate the encrypted secret data 1051, in accordance with the request from the secure operation system 1042.

The cache locking unit 1045 reads the data in the designated region in the memory 1020 into the cache 1004, in accordance with the request from the secure operation system 1042. Then the cache locking unit 1045 locks (a part of) the cache 1004, so as to restrict the data in the cache 1004 from being written out into the memory 1020.

Here, locking the cache 1004 means restricting the data in the cache 1004 from being written back in the memory 1020. Locking the cache 1004 allows, for example, data frequently utilized to be maintained in the cache 1004, thereby improving the data processing performance.

A typical process with respect to the cache 1004 is locking the cache 1004 with the data stored in the memory 1020 read into the cache 1004. For such a process, the cache locking unit 1045 according to this embodiment reads the data stored in the memory 1020 into the cache 1004, before locking the cache 1004. The data thus read into the cache 1004 is not to be utilized.

The cache locking unit 1045 also writes a zero value in the region to be unlocked in the cache 1004, in accordance with the request from the secure operation system 1042, after which the cache locking unit 1045 unlocks the cache 1004.

In the case where the cache 1004 is unlocked without the writing of the zero value, the secret data written in the cache 1004 is written back in the memory 1020. To prevent this, the cache locking unit 1045 writes the zero value in the region to be unlocked in the cache 1004, before unlocking the cache 1004.

Examples of the locking method of the cache 1004 include locking the entirety (all the ways) of the cache 1004, locking some of the ways thereof, and locking some lines thereof.

In the case where the CPU 1001 is permitted to read the tag information in the cache 1004, the cache locking unit 1045 acquires the tag information by locking some ways or some lines. Then the cache locking unit 1045 identifies the way or line corresponding to the region designated by the secure operation system 1042, and locks the identified way or fine.

In the case where the CPU 1001 is not permitted to read the tag information in the cache 1004, the locking of some ways or lines is performed as follows.

First, the cache locking unit 1045 reflects the data stored in the unlocked ways or lines in the cache 1004, to the memory 1020. The cache locking unit 1045 then invalidates such data in the cache 1004. Accordingly, the data in the region designated by the secure operation system 1042 is no longer stored in the cache 1004.

The cache locking unit 1045 locks the ways or lines, except for the way or line to be eventually locked, and then reads the data in the region designated by the secure operation system 1042.

Then, the cache locking unit 1045 unlocks the ways or lines locked as above. On the other hand, the cache locking unit 1045 locks the way or line in which the data in the region designated by the secure operation system 1042 is stored. When unlocking the ways or lines locked as above, the cache locking unit 1045 does not unlock the ways or lines that have been locked from the beginning.

At this point, the way or line corresponding to the region designated by the secure operation system 1042 is locked.

The loading and unloading process of the secret data 1010 will be subsequently described in detail referring to a sequence chart.

The content playback application 1043 plays back, upon receipt of a request from the player application 1032, the content received by the content receiving application 1033 from the content recording apparatus 120. However, the content received by the content receiving application 1033 from the content recording apparatus 120 is encrypted. Accordingly, the content playback application 1043 requests the secure operation system 1042 to load the secret data 1010 containing the decryption key, for decrypting the encrypted content.

The secure environment 1200 may further include secure applications not shown in FIG. 4.

[Encrypted Secret Data 1051]

Figure 5:
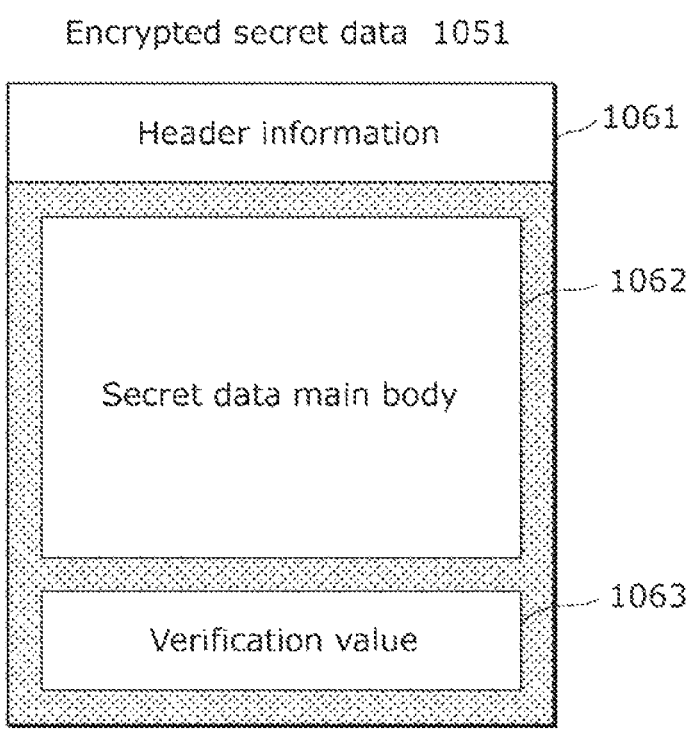
FIG. 5 is a schematic drawing showing a structure of encrypted secret data according to Embodiment 1.

FIG. 5 is a schematic drawing showing the structure of the encrypted secret data 1051 shown in FIG. 2. As shown in FIG. 5, the encrypted secret data 1051 includes header information 1061, a secret data main body 1062, and a verification value 1063. The header information 1061 is stored without being encrypted, while the secret data main body 1062 and the verification value 1063 are encrypted before being stored.

The header information 1061 includes the start point and size of the secret data main body 1062, the start point and size of the verification value 1063, the encryption mode, an identifier, and so forth. The encryption mode corresponds to the cryptography employed for encrypting the secret data main body 1062 and the verification value 1063. The identifier serves for identification of the verification algorithm for the verification value 1063.

The secret data main body 1062 includes the key for decrypting the encrypted content received from the content recording apparatus 120, and information of a parameter to be employed in the decryption algorithm. Such information has to be protected from an attack by hardware such as a bus probe, as well as an attack by software utilizing an illegitimate application. Therefore, the secret data main body 1062 is encrypted when recorded in the non-volatile storage device 1050.

The secret data main body 1062 is decrypted and loaded in the cache 1004, when the secure application such as the content playback application 1043 is about to utilize the secret data main body 1062. Before that, the cache 1004 reads the data in the memory region corresponding to the region where the secret data main body 1062 is to be loaded. Then the cache 1004 is locked so as to restrict the secret data main body 1062 from being written out into the memory 1020. Then, the secret data main body 1062 is loaded in the cache 1004.

The verification value 1063 is utilized for verifying that the secret data main body 1062 has not been subjected to falsification. More specifically, the verification value 1063 is a hash value obtained by inputting the unencrypted secret data main body 1062 in a hash function. The verification value 1063 is then encrypted together with the secret data main body 1062.

The secret data 1010 is not limited to the key for decrypting the encrypted content and the information of the parameter to be employed in the decryption algorithm. The secret data 1010 may include other secret data that has to be concealed, such as device keys individually given to the content display apparatus 110 and like apparatuses. Further, the secret data 1010 may be a code of an algorithm that has to be concealed, or a code for handling data that has to be concealed.

Although the encrypted secret data 1051 shown in FIG. 5 includes a single piece of secret data main body 1062, the encrypted secret data 1051 may be otherwise configured. The encrypted secret data 1051 may include a plurality of secret data main bodies. In this case, the secret data main bodies may be encrypted as a series of data, or individually encrypted as independent pieces of data. The secret data main bodies may each be encrypted by different cryptography, or using a different encryption key.

Likewise, the encrypted secret data 1051 may include a plurality of verification values corresponding to the plurality of secret data main bodies, or a verification value list collectively including those verification values. Further, the encrypted secret data 1051 may include a single verification value 1063 corresponding to all the secret data main bodies in the encrypted secret data 1051.

Although the encrypted secret data 1051 shown in FIG. 5 includes the verification value 1063, the encrypted secret data 1051 may be otherwise configured. The verification value 1063 may be independent from the encrypted secret data 1051, or may even be omitted. Although the verification value 1063 is encrypted in this embodiment, it is not mandatory that the verification value 1063 be encrypted. The verification value 1063 may be encrypted together with the secret data main body 1062, or may be encrypted independently therefrom.

For encrypting the secret data main body 1062, common key cryptography such as DES or AES, public key cryptography such as RSA or ElGamal, or a combination thereof may be employed.

Although the secret data main body 1062 and the verification value 1063 are encrypted together, the encryption may be otherwise performed. The secret data main body 1062 and the verification value 1063 may be encrypted independently of each other, and alternatively the verification value 1063 may remain unencrypted while the secret data main body 1062 is encrypted.

The verification value 1063 may be located anterior to the secret data main body 1062, instead of posterior thereto. The verification value 1063 may be included in the header information 1061. Further, the verification value 1063 may be included in the verification value list including the plurality of verification values of the encrypted secret data 1051, independently from the encrypted secret data 1051.

Further, algorithms such as MD4, MD5, SHA-1, and SHA-2 may be employed as the hash function. In addition, the verification value 1063 may be a digital signature, a message authentication code (MAC) value, an error detection code value, or an error correction code value, instead of the has value.

To calculate the MAC value, for example the CBC-MAC algorithm and the HMAC algorithm are available. To calculate the error detection code value, a cyclic redundancy cheek (CRC) algorithm and a checksum algorithm are available. To calculate the error correction code value, a Reed Solomon coding and a turbo code algorithm are available.

The encrypted secret data 1051 is stored in the non-volatile storage device 1050 in the manufacturing process of the content display apparatus 110 at a plant. In this process the initial data of the secret data main body 1062 is generated, and encrypted with an individual key provided to each apparatus, so that the encrypted secret data 1051 is generated. The key used for the encryption is stored in the key storage unit 1006 in the system LSI 1000.

Alternatively, the encrypted secret data 1051 may be distributed to the content display apparatus 110 through a communication channel such as a network. In this case, the encrypted secret data 1051 that has been encrypted with an individual key may be distributed to each apparatus. Alternatively, the encrypted secret data 1051 may be distributed with a key common to all the apparatuses. In the latter case, an individual key may further be provided to each apparatus for encrypting the encrypted secret data 1051 after the content display apparatus 110 receives the encrypted secret data 1051, and the encrypted secret data 1051 thus encrypted may be stored in the content display apparatus 110.

Further, the encrypted secret data 1051 may be transmitted via a portable recording medium instead of the network, thus to be stored in the content display apparatus 110.

[Configuration of Package Generation Unit]

Figure 6:
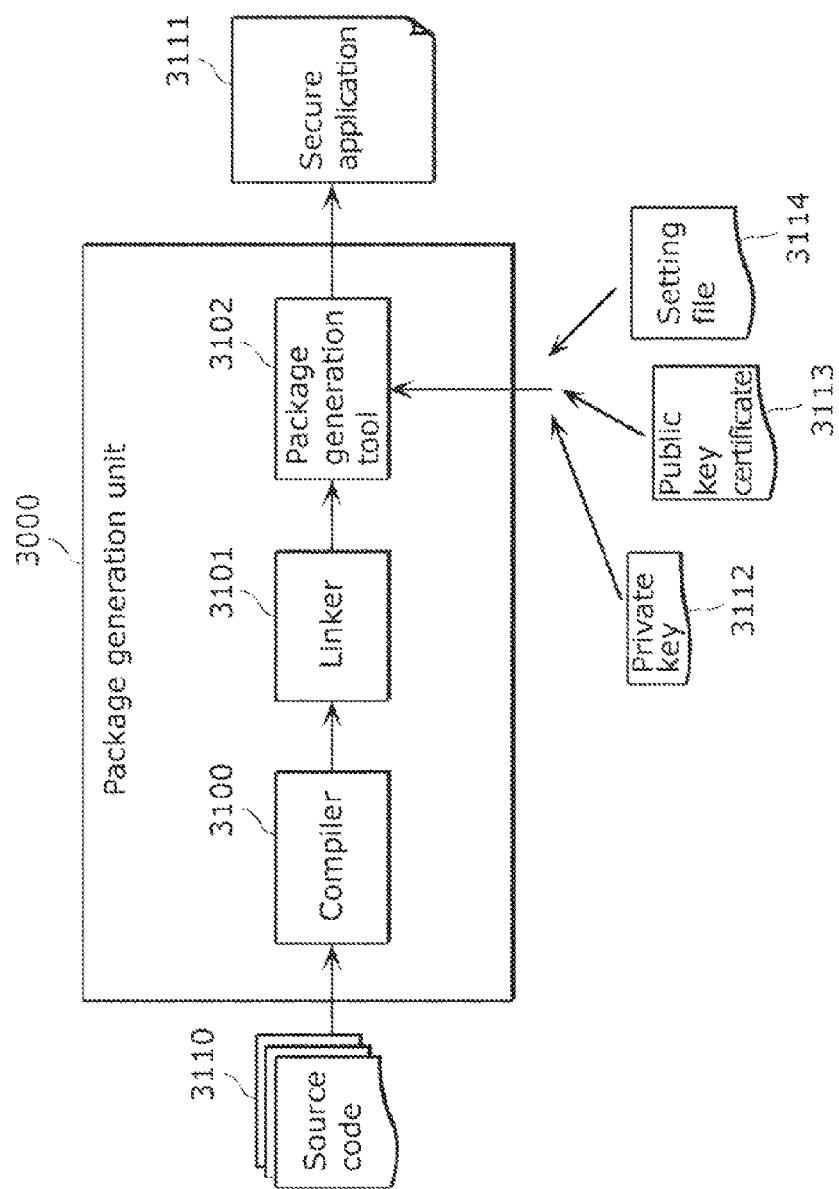
FIG. 6 is a block diagram showing a configuration of a package generation unit according to Embodiment 1.

FIG. 6 is a block diagram showing a configuration of a package generation unit for generating a secure application according to this embodiment. As shown in FIG. 6, the package generation unit 3000 includes a compiler 3100, a linker 3101, and a package generation tool 3102. The package generation unit 3000 generates the secure application 3111 from a source code (program source code) 3110, by using a private key 3112, a public key certificate 3113, and a setting file 3114.

The compiler 3100 compiles the source codes 3110 that have been inputted, and generates an object file.

The linker 3101 links a library to the object file generated by the compiler 3100. The linker 3101 then generates a program file that can be executed by the content display apparatus 110.

The package generation tool 3102 generates the secure application 3111 from the program file generated by the linker 3101, by using the setting file 3114, the private key 3112, and the public key certificate 3113.

The package generation unit 3000 is included in a secure application developing apparatus different from the content display apparatus 110. The secure application 3111 generated by the package generation unit 3000 in the secure application developing apparatus is stored as the encrypted content playback application 1054 and so forth, in the non-volatile storage device 1050 of the content display apparatus 110.

[Structure of Secure Application 3111]

Figure 7:
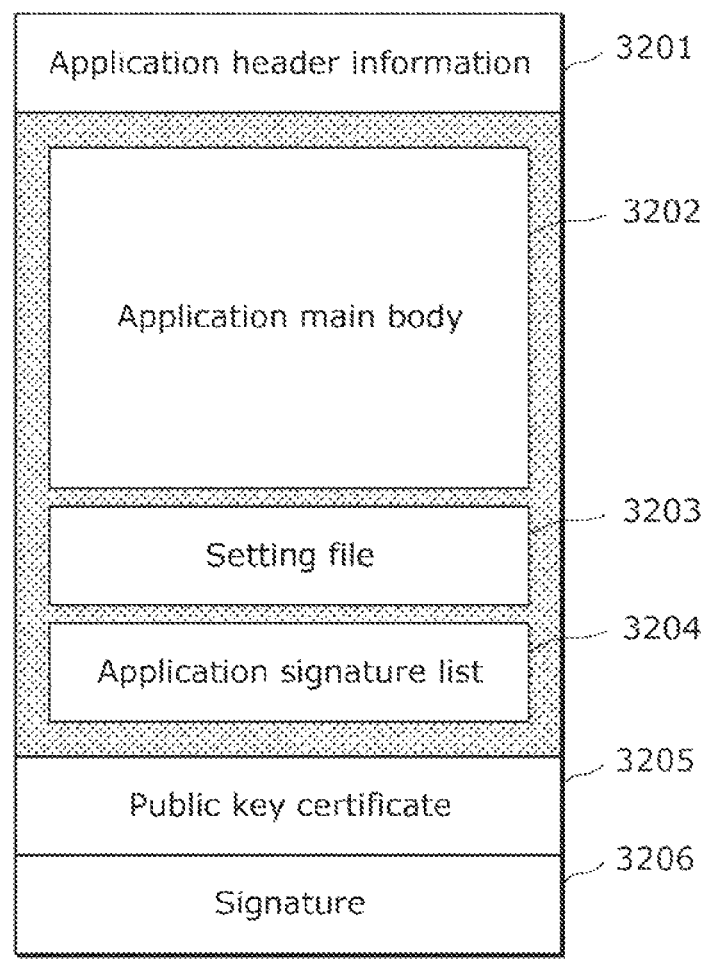
FIG. 7 is a schematic drawing showing a structure of a secure application according to Embodiment 1.

FIG. 7 is a schematic drawing showing the structure of the secure application 3111 according to this embodiment. As shown in FIG. 7, the secure application 3111 includes application header information 3201, an application main body 3202, a setting file 3203, an application signature list 3204, a public key certificate 3205, and a signature 3206.

The structure of the secure application 3111 shown in FIG. 7 may also be applied not only to the content playback application 1043, but also to the boot loader 1041 and the secure operation system 1042.

The application header information 3201 includes an identifier for identifying the secure application 3111. The application header information 3201 also includes the start address, size, and number of files of the application main body 3202, the setting file 3203, the application signature list 3204, and the public key certificate 3205, respectively. The application header information 3201 also includes information regarding the cryptography employed for encrypting the application main body 3202, the setting file 3203, and the application signature list 3204.

The application main body 3202 is a program file generated from the source code 3110 by using the compiler 3100 and the linker 3101.

The setting file 3203 is the same file as the setting file 3114 inputted to the package generation tool 3102.

The application signature list 3204 includes the signature of both the application main body 3202 and the setting file 3203. The package generation tool 3102 generates, when generating the secure application 3111, the respective signatures of the inputted application main body 3202 and setting file 3203, thus to generate the application signature list 3204. To generate the signatures, the private key 3112 is employed.

The public key certificate 3205 is the same certificate as the public key certificate 3113 inputted to the package generation tool 3102.

The signature 3206 is the signature of a series of data composed of the application header information 3201, the application main body 3202, the setting file 3203, the application signature list 3204, and the public key certificate 3205. Here, the application main body 3202, the setting file 3203, and the application signature list 3204 remain encrypted when the signature 3206 is generated.

Here, the secure application 3111 described above is configured so as to include one each of the application main body 3202, the setting file 3203, the application signature list 3204, and the public key certificate 3205, however the secure application 3111 may be otherwise configured. One of the application main body 3202, the setting file 3203, the application signature list 3204, and the public key certificate 3205 may be composed of a plurality of files, or may be omitted.

Further, although the secure application 3111 described above includes the application signature list 3204 in which the signatures of both the application main body 3202 and the setting file 3203 are listed, the secure application 3111 may be otherwise configured. The secure application 3111 may separately include each of the signatures corresponding to the application main body 3202 and the setting file 3203.

[Secure Boot Process]

The content display apparatus 110 verifies, upon being activated, that the boot loader 1041 and the secure operation system 1042 set to operate in the secure environment 1200 are not subjected to falsification.

Hereunder, the process from the turning on of the content display apparatus 110 up to the activation of the general-purpose operation system 1031 (secure boot process) will be described referring to the sequence chart shown in FIG. 8.

After the content display apparatus 110 is turned on, the CPU 1001 executes the IPL 1002 in the system LSI 1000, in the secure mode and the privilege mode. Hereafter, when the CPU 1001 executes processing in accordance with the IPL 1002, this may be expressed as "IPL 1002 executes processing". Likewise, when the CPU 1001 executes processing in accordance with a program, this may be expressed as "program executes processing".

The IPL 1002 first performs the initialization of the hardware of the content display apparatus 110 (S1000). More specifically, the IPL 1002 performs processing such as operation check of the memory 1020, initialization of the memory control unit 1003, initialization of the peripheral circuits (not shown), and so forth. The IPL 1002 then defines the normal region 1030 and the secure region 1040 in the memory 1020, upon initializing the memory control unit 1003.

After the initialization, the IPL 1002 loads the boot loader 1041 in the secure region 1040 from the non-volatile storage device 1050 (S1001). Then the IPL 1002 checks whether the boot loader 1041 loaded in the secure region 1040 has been subjected to falsification (S1002). Here, the IPL 1002 utilizes the signature accompanying the boot loader 1041 and the public key certificate, for the falsification check of the boot loader 1041.

In the case where the IPL 1002 decides that the boot loader 1041 has not been subjected to falsification as a result of the check (OK at S1002), the IPL 1002 activates the boot loader 1041 (S1003). In the case where the IPL 1002 decides that the boot loader 1041 has been subjected to falsification (NG at S1002), the IPL 1002 finishes the activation of the content display apparatus 110.

Upon being activated by the IPL 1002 (S1003), the boot loader 1041 performs initial setting of the secure environment

1200 (S1004). Specifically, the boot loader 1041 performs, at the initial setting (S1004), various settings for executing the secure operation system 1042, the secure application 3111, and so forth in the secure environment 1200.

Upon completing the initial setting, the boot loader 1041 loads the secure operation system 1042 in the secure region 1040 from the non-volatile storage device 1050 (S1005). Then the boot loader 1041 checks whether the secure operation system 1042 loaded in the secure region 1040 has been subjected to falsification (S1006). Here, the boot loader 1041 utilizes the signature accompanying the secure operation system 1042 and the public key certificate, for the falsification check of the secure operation system 1042.

In the case where the boot loader 1041 decides that the secure operation system 1042 has not been subjected to falsification as a result of the check (OK at S1006), the boot loader 1041 activates the secure operation system 1042 (S1007). In contrast, in the case where the boot loader 1041 decides that the secure operation system 1042 has been subjected to falsification (NG at S1006), the case where the boot loader 1041 decides that the secure operation system 1042 has not been subjected to falsification as a result of the check does not activate the secure operation system 1042.

Upon being activated by the boot loader 1041 (S1007), the secure operation system 1042 performs initial setting of the secure operation system 1042 itself, and initial setting for executing the secure application 3111 and so forth in the relevant environment (S1008). Upon completing the initial setting, the secure operation system 1042 notifies the boot loader 1041 of the completion of the initialization (S1009).

In the case where the boot loader 1041 decides that the secure operation system 1042 has been subjected to falsification (NG at S1006), the boot loader 1041 sets a secure boot failure flag (S1010). The secure boot failure flag is looked up when the software execution environment is shifted from the normal environment 1100 to the secure environment 1200.

In the case where the secure boot process has failed, the boot loader 1041 notifies the normal environment 1100 of the processing error by using the secure boot failure flag. In addition, the applications set to operate in the normal environment 1100 can also access the secure boot failure flag in a read-only mode. In other words, the applications operating in the normal environment 1100 can look up the secure boot failure flag.

After the completion notice of the initialization (S1009), or after setting the flag (S1010), the boot loader 1041 loads the general-purpose operation system 1031 in the normal region 1030 from the non-volatile storage device 1050 (S1011). Then the boot loader 1041 switches the CPU 1001 to the normal mode, and executes the general-purpose operation system 1031 (S1012).

Although the boot loader 1041 is set to load the general-purpose operation system 1031 in the aforementioned process, the process may be otherwise arranged.

After completing the initialization, the secure operation system 1042 may load the general-purpose operation system 1031, instead of letting the boot loader 1041 perform the subsequent processing. In this case, the secure operation system 1042 may switch the CPU 1001 to the normal mode and execute the general-purpose operation system 1031, after loading the general-purpose operation system 1031.

Although in the aforementioned process the CPU 1001 is switched to the normal mode and the general-purpose operation system 1031 is executed after the general-purpose operation system 1031 is loaded, the process may be otherwise arranged.

The falsification check of the general-purpose operation system 1031 may be performed after the general-purpose operation system 1031 is loaded. Then the CPU 1001 may be switched to the normal mode and the general-purpose operation system 1031 may be executed, in the case where the general-purpose operation system 1031 is decided to be free from falsification.

In the case where the general-purpose operation system 1031 is decided to have been subjected to falsification, the activation of the content display apparatus 110 may be finished. Alternatively, the secure boot failure flag may be set in the case where the general-purpose operation system 1031 has been subjected to falsification. In this case, the CPU 1001 may be switched to the normal mode and the general-purpose operation system 1031 may be executed, with the secure boot failure flag set as above.

[Loading of Secret Data 1010]

The secure operation system 1042 loads the secret data 1010 upon receipt of a request from the secure application 3111 to load the secret data 1010. More specifically, the secure operation system 1042 utilizes the secret data loading unit 1044 and the cache locking unit 1045 to load the secret data 1010 in the system LSI 1000.

Thus, the secure operation system 1042 protects the secret data 1010 from an attack by hardware such as a bus probe, as well as an attack by software utilizing a debugger or an illegitimate application.

Figure 9:
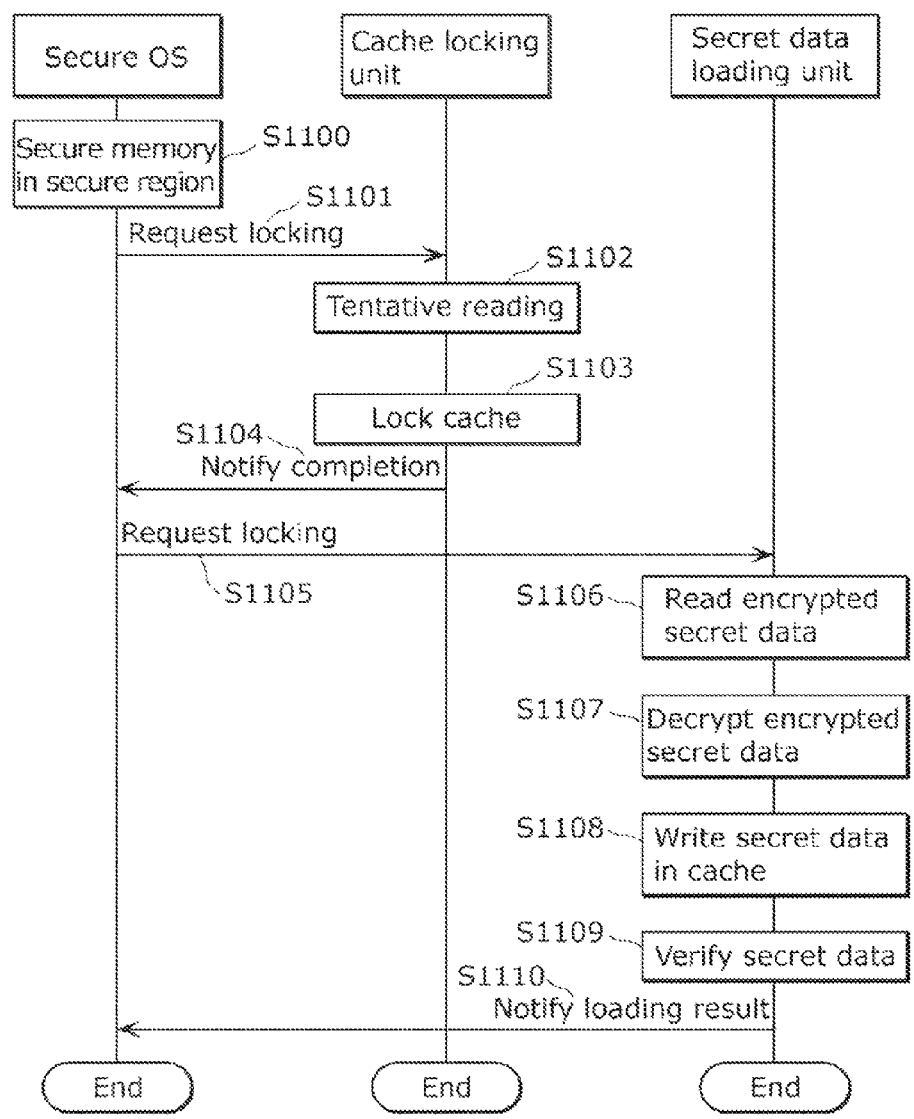
FIG. 9 is a sequence chart showing a loading process of the secret data according to Embodiment 1.

Hereunder, the process of loading the secret data 1010 in the cache 1004 provided for the data in the secure region 1040 will be described referring to the sequence chart shown in FIG. 9.

Upon receipt of a request to load the secret data 1010 from the secure application 3111, for example the content playback application 1043, the secure operation system 1042 secures a memory region for the secret data 1010, in the secure region 1040 (S1100).

Then the secure operation system 1042 notifies the information of the secured memory region (address and size) to the cache locking unit 1045 and requests the cache locking unit 1045 to lock the cache 1004 (S1101).

The cache locking unit 1045 performs data reading so that the data in the memory region (part of the secure region 1040) notified from the secure operation system 1042 is read into the cache 1004 (S1102). The step S1102 is intended to cause the cache 1004 to read the data, and hence the read data will not actually be utilized. Accordingly, the cache locking unit 1045 may read empty data not having a value.

The cache locking unit 1045 locks the cache 1004, to thereby restrict the data read into the cache 1004 at S1102 from being excluded from the cache 1004 and written out into the memory 1020 outside the system LSI 1000 (S1103). With such an arrangement, even though the data in the locked region is modified the modified data is restricted from being written in the memory 1020.

The cache locking unit 1045 then notifies the secure operation system 1042 that the locking process has been completed (S1104).

Then the secure operation system 1042 requests the secret data loading unit 1044 to load the secret data 1010 in the locked region in the cache 1004 (S1105). At this point, the secure operation system 1042 notifies the information of the cache region (address and size) where the secret data 1010 is to be loaded, to the secret data loading unit 1044.

The secret data loading unit 1044 reads the encrypted secret data 1051 from the non-volatile storage device 1050

(S1106). At this point, the secret data loading unit 1044 may load the encrypted secret data 1051 in the secure region 1040 in the memory 1020.

The secret data loading unit 1044 decrypts the encrypted secret data 1051 by using the key retained in the key storage unit 1006, to thereby acquire the secret data 1010 (S1107). Then the secret data loading unit 1044 writes the decrypted secret data 1010 in the region notified from the secure operation system 1042 (S1108).

Upon completing the writing, the secret data loading unit 1044 verifies that the data has not been subjected to falsification by using the verification value 1063 accompanying the encrypted secret data 1051 (S1109). In the case where the data proves to have been subjected to falsification, the secret data loading unit 1044 overwrites zero on the entirety of the loaded data.

Thereafter, the secret data loading unit 1044 notifies the secure operation system 1042 that the loading process has been completed (S1110). In the case where the secret data 1010 is normally loaded and decided to have been free from falsification as a result of the verification, the secret data loading unit 1044 notifies the normal completion to the secure operation system 1042. On the contrary, in the case where the secret data 1010 has been subjected to falsification, the secret data loading unit 1044 transmits an error notice to the secure operation system 1042.

In the aforementioned process, the cache 1004 is locked before the secret data 1010 is loaded therein. Accordingly, after the secret data 1010 is written in the cache 1004, the secret data 1010 is prevented from flowing out of the system LSI 1000, and thus protected from an attack by hardware such as a bus probe.

In addition, the memory region allocated for the secret data 1010 is secured in the secure region 1040. Therefore, the secret data 1010 is also protected from an attack by software such as a debugger or an illegitimate application operable in the normal environment 1100.

At S1102 of the aforementioned process, the cache locking unit 1045 performs the data reading so that the data in the memory region notified from the secure operation system 1042 is read into the cache 1004. However, the process may be otherwise arranged.

For example, the cache locking unit 1045 may decide whether the data in the memory region notified from the secure operation system 1042 has already been read into the cache 1004. Then the cache locking unit 1045 may perform the reading process (S1102), in the case where the data has not yet been read. Alternatively, the secure operation system 1042 may perform the reading process of S1102. In the case where the data has already been read into the cache 1004, the reading process of S1102 may be skipped.

In addition, for example, in the case where an overwritable cache region is available in the cache 1004, such a cache region may be utilized for loading therein the secret data 1010. More specifically, the cache locking unit 1045 may lock the overwritable cache region, and the secret data loading unit 1044 may load the secret data 1010 in the cache region thus locked.

Further, although the secure operation system 1042 secures the memory region for the secret data 1010 in the secure region 1040 in the aforementioned process, the memory region may be secured in a different region. When the secret data 1010 is in an environment free from an attack by software such as a debugger or an illegitimate application, and hence it suffices for the secret data 1010 to be protected from an attack by hardware, the secure operation system 1042 may secure the memory region for the secret data 1010 in the normal region 1030.

[Unloading of Secret Data 1010]

Upon receipt of a request from the secure application 3111 to unload the secret data 1010, the secure operation system 1042 unloads the secret data 1010 utilizing the secret data loading unit 1044 and the cache locking unit 1045. The cache locking unit 1045 overwrites zero data (zero value) on the cache region, to thereby restrict the secret data 1010 from being written out of the system LSI 1000. After that, the cache locking unit 1045 unlocks the cache region thus far locked during the loading process.

Figure 10:
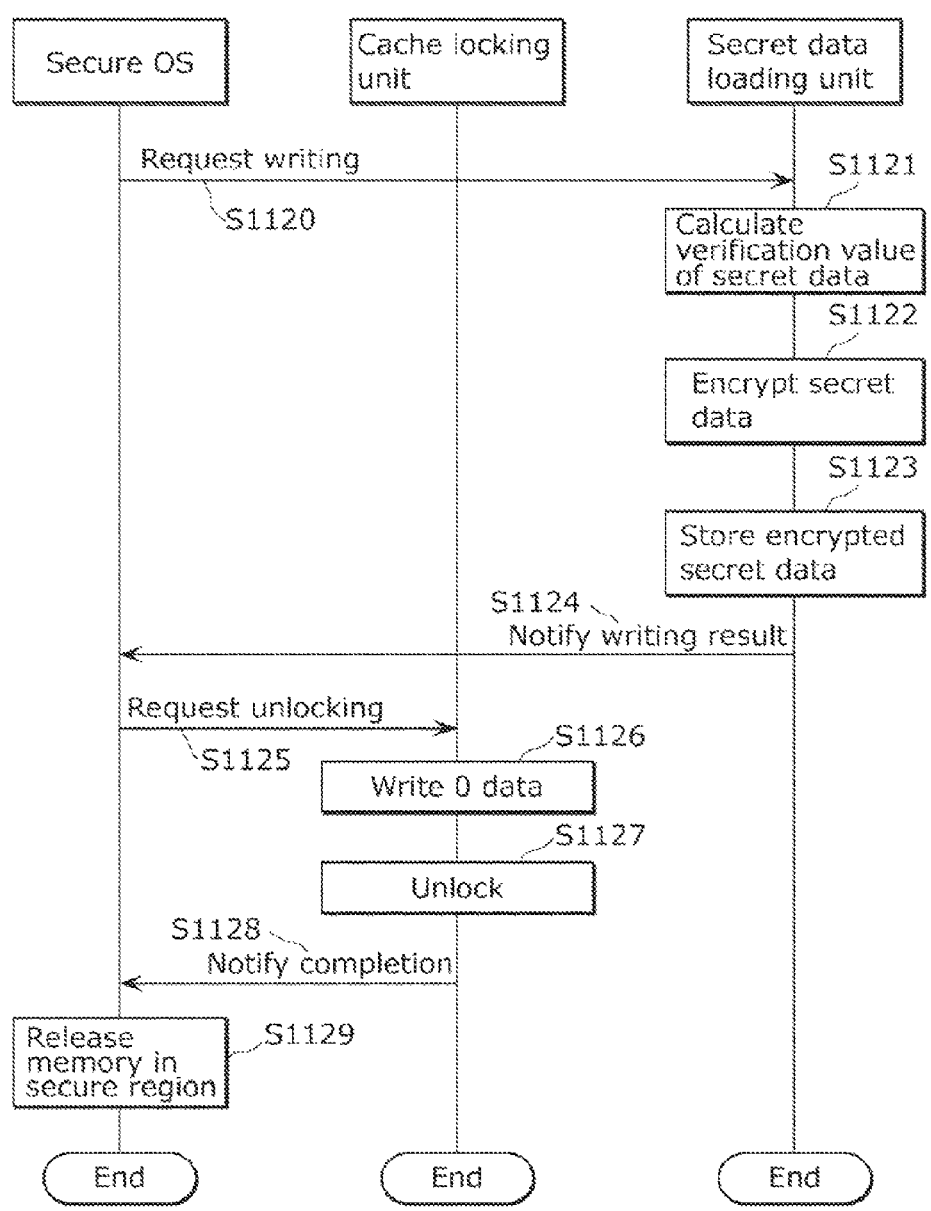
FIG. 10 is a sequence chart showing an unloading process of the secret data according to Embodiment 1.

Hereunder, a process from the request to unload the secret data 1010 up to the unloading thereof will be described, referring to the sequence chart shown in FIG. 10.

Upon receipt of the request from the secure application 3111 to unload the secret data 1010, the secure operation system 1042 requests the secret data loading unit 1044 to write the secret data 1010 (S1120).

The secret data loading unit 1044 calculates the verification value 1063 from the secret data 1010 (S1121). The secret data loading unit 1044 also encrypts the secret data 1010 with the key retained in the key storage unit 1006, to thereby generate the encrypted secret data 1051 (S1122). Then the secret data loading unit 1044 writes the generated encrypted secret data 1051 in the non-volatile storage device 1050 (S1123). After that, the secret data loading unit 1044 notifies the writing result to the secure operation system 1042 (S1124).

Then, the secure operation system 1042 requests the cache locking unit 1045 to unlock the cache 1004 which has been locked (S1125).

The cache locking unit 1045 overwrites the zero value on the entire region in the cache region where the secret data 1010 is recorded (S1126). The cache locking unit 1045 then unlocks the cache 1004 locked in the loading process of the secret data 1010 (S1127). Thereafter, the cache locking unit 1045 notifies the secure operation system 1042 that the unlocking process has been completed (S1128).

The secure operation system 1042 releases the memory region in the secure region 1040 corresponding to the cache region where the secret data 1010 is loaded (S1129).

In the case where the cache 1004 is unlocked without overwriting the zero value (S1126) in the unloading process of the secret data 1010, the secret data 1010 remaining in the cache 1004 is written out into the memory 1020. Overwriting the zero value at S1126 causes the zero value, instead of the secret data 1010, to be written out into the memory 1020.

Therefore, even though the cache 1004 is unlocked and the data in the cache 1004 is written out into the memory 1020, the secret data 1010 can be prevented from being written out into the memory 1020.

As described above, the content display apparatus 110 according to this embodiment handles the secret data 1010 such as the key utilized for playing back the content inside the system LSI 1000. Therefore, the content display apparatus 110 can protect the secret data 1010 from an attack by hardware. In addition, the content display apparatus 110 secures the memory region for the secret data 1010 in the secure region 1040, and thus protects the secret data 1010 also from an attack by software.

In this embodiment, accordingly, the content display apparatus 110 can possess three types of regions each having a different security strength (protection strength). The first one is the normal region 1030 which is not protected. The second one is the secure region 1040 protected from an attack by software. The third one is the region protected from both an attack by hardware and an attack by software.

The secret data loading unit 1044 loads the secret data 1010 in the secure environment 1200. Therefore, the secret data 1010 can be prevented from being illegitimately acquired by a debugger or an illegitimate program operable in the normal environment 1100.

In this embodiment, a part of the cache 1004 in the system LSI 1000 is utilized. Accordingly, the system LSI 1000 does not have to possess an exclusive memory thereinside, and the shared memory is efficiently utilized. Further, since the original function of the cache 1004 is utilized, the processes according to this embodiment are directly applicable to existing systems without providing additional hardware.

Further, performing the loading and the unloading exempts the cache 1004 from having a part thereof constantly occupied (locked). The cache 1004 is locked only when the secret data 1010 is processed. Accordingly, the data caching function of the cache 1004 can be effectively utilized.

In this embodiment, the cache 1004 starts to be locked when the processing of the secret data 1010 is started. Alternatively, the cache 1004 may start to be locked when the application that utilizes the secret data 1010 is activated. In this case, the cache 1004 may be unlocked when the application that utilizes the secret data 1010 is finished.

Such an arrangement allows the secret data 1010 to be maintained in the cache 1004 while the application that utilizes the secret data 1010 is operating. Therefore, the processing load originating from the loading and unloading of the secret data 1010 can be reduced.

Further, in the case where sufficient capacity is available in the cache 1004, the cache 1004 may start to be locked when the content display apparatus 110 is activated. For example, the cache locking unit 1045 may start to lock the cache 1004 for the secret data 1010, when the secure operation system 1042 is activated. In this case, the cache 1004 does not have to be unlocked. With such arrangements also, the secret data 1010 can be effectively protected.

Embodiment 2

In Embodiment 1, the secure operation system 1042 is set to load the secret data 1010 in the cache 1004 according to a request from the secure application 3111 such as the content playback application 1043. In Embodiment 2, the application main body 3202 of the secure application 3111 includes a portion to be loaded in the secure region 1040 and a portion to be loaded in the cache 1004. When the secure application 3111 is loaded, each of such portions is individually loaded.

Hereafter, description will be made on the configuration of the secure operation system 1042, the package generation unit 3000, the secure application 3111, and the application main body 3202 according to this embodiment, as well as the loading process of the secure application 3111. The same constituents as those of Embodiment 1 will be given the same numeral, and the description thereof will not be repeated.

[Configuration of Secure Operation System 1042]

Figure 11:
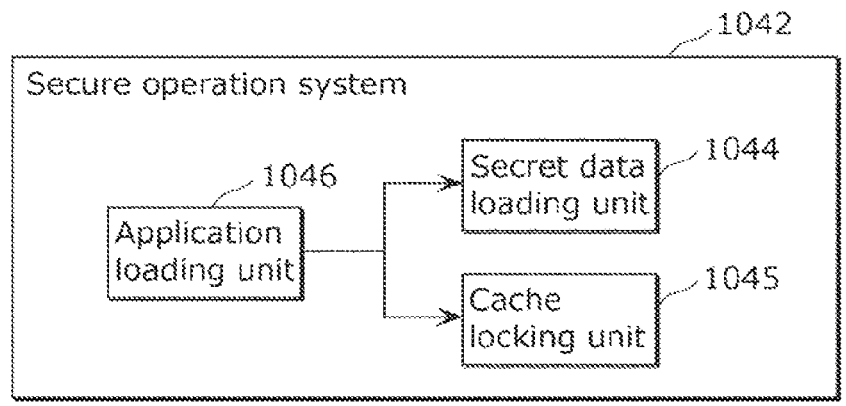
FIG. 11 is a block diagram showing a configuration of a secure operation system according to Embodiment 2.

FIG. 11 is a block diagram showing a configuration secure operation system 1042 according to this embodiment. As shown in FIG. 11, the secure operation system 1042 includes the secret data loading unit 1044, the cache locking unit 1045, and an application loading unit 1046.

The application loading unit 1046 acquires the application header information 3201 included in the secure application 3111, when the secure application 3111 is loaded. The application loading unit 1046 then decides whether the application main body 3202 includes a secret code or data to be concealed from an attack by hardware, on the basis of the application header information 3201.

In the case were the secret code or data to be concealed is included, the application loading unit 1046 requests the cache locking unit 1045 to lock a region in the cache 1004 where the secret code or data is to be loaded. Then the application loading unit 1046 decrypts and loads the secure application 3111.

The secret data loading unit 1044 and the cache locking unit 1045 have the same configuration as the secret data loading unit 1044 and the cache locking unit 1045 according to Embodiment 1.

Here, the entirety of the application main body 3202 may be loaded in the locked region in the cache 1004. Alternatively, the entire region in the cache 1004 where the application main body 3202 is to be loaded may be locked, and a part of the locked region corresponding to data unnecessary to conceal may be unlocked, after the decryption and the loading are performed. In this case, the data is not overwritten with the zero value, unlike in the unloading process of the secret data 1010.

[Configuration of Package Generation Unit 3000]

The package generation unit 3000 according to this embodiment is configured similarly to the package generation unit 3000 according to the embodiment 1, except for a part of the operation. Description of the constituents that operate in the same way as in Embodiment 1 will not be repeated.

The compiler 3100 compiles the source codes 3110 that have been inputted, and generates an object file. At this point, the compiler 3100 stores, out of the source codes 3110, data with an identifier indicating that the data is the secret data 1010, a function for processing the secret data 1010, and a code with an identifier indicating that the data has to be concealed, in a specific section.

The specific section is accompanied with an identifier indicating that the data stored therein is the secret data 1010 and that the codes are related to the secret data 1010. The details of the specific section will be subsequently described.

The linker 3101 and the package generation tool 3102 have the same configuration as the linker 3101 and the package generation tool 3102 according to Embodiment 1.

Although the compiler 3100 is set to store the secret data 1010 and the code related thereto in the specific section in this embodiment, a different functional unit may store the secret data 1010 and the code related thereto in the specific section.

For example, the compiler 3100 may notify the linker 3101 that the source codes 3110 include the secret data 1010 or a code related thereto. Then the linker 3101 may store the secret data 1010 and the code related thereto in the specific section, when performing the linking process.

Alternatively, the compiler 3100 may notify the package generation tool 3102 that the source codes 3110 include the secret data 1010 or a code related thereto. Then the package generation tool 3102 may store the secret data 1010 and the code related thereto in the specific section, when generating the package.

[Configuration of Secure Application 3111]

The secure application 3111 according to this embodiment includes the application header information 3201, the application main body 3202, the setting file 3203, the application signature list 3204, the public key certificate 3205, and the signature 3206.

The application header information 3201 possesses a flag indicating whether the application main body 3202 includes the secret code or data. The remaining portion of the information is the same as that of Embodiment 1, and therefore the description thereof will not be repeated.

The application main body 3202, the setting file 3203, the application signature list 3204, the public key certificate 3205, and the signature 3206 are configured in the same way as in Embodiment 1, and therefore the description thereof will not be repeated.

[Structure of Application Main Body 3202]

Figure 12:
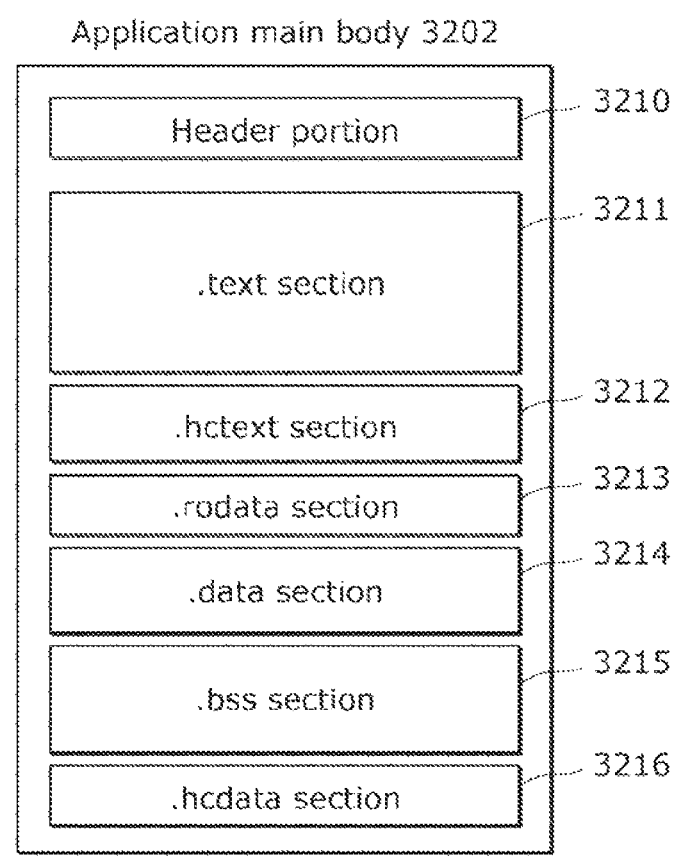
FIG. 12 is a block diagram showing a structure of an application main body according to Embodiment 2.

FIG. 12 is a block diagram showing the structure of the application main body 3202 according to this embodiment. As shown in FIG. 12, the application main body 3202 includes a header portion 3210, a .text section 3211, a .hctext section 3212, a .rodata section 3213, a data section 3214, a .bss section 3215, and a .hcdata section 3216.

The header portion 3210 contains information of the type, start address, and size of the plurality of sections following the header portion 3210.

The .text section 3211 serves for storing program codes, and is set in read-only and executable mode.

The .hctext section 3212 serves for storing program codes including a code related to the secret data 1010, and is set in read-only and executable mode.

The .rodata section 3213 serves for storing constant data, and is set in read-only and unexecutable mode.

The .data section 3214 serves for storing data with an initial value, and is set in readable and writable, and unexecutable mode.

The .bss section 3215 serves for storing data without an initial value, and is set in readable and writable, and unexecutable mode.

The .hcdata section 3216 serves for storing the secret data 1010, and is set in readable and writable, and unexecutable mode.

Regarding the application main body 3202 thus configured, the application loading unit 1046 loads the .hctext section 3212 and the .hcdata section 3216 in the locked region in the cache 1004. The application loading unit 1046 loads the remaining sections in the secure region 1040.

Here, although the .hctext section 3212 and the .hcdata section 3216 are set to be loaded in the locked region in this embodiment, other sections may be loaded in the locked region.

The header portion 3210 may include a flag indicating whether the data of the .text section 3211 and the .data section 3214 are to be loaded in the locked region in the cache 1004 or in the secure region 1040. Then the application loading unit 1046 may decide in which of the locked region in the cache 1004 or in the secure region 1040 the data is to be loaded, according to the flag.

In this embodiment, the application main body 3202 mixedly includes the portion to be loaded in the locked region in the cache 1004 and the portion to be loaded in the secure region 1040. However, the secure application 3111 may be otherwise configured. The secure application 3111 may include a pair of application main bodies 3202 and 3202a (not shown). In this case, the application main body 3202 may be loaded in the secure region 1040 and the application main body 3202a may be loaded in the locked region in the cache 1004.

[Loading to Secure Application 3111]

The secure operation system 1042 decides whether the secure application 3111 includes a secret code or data to be concealed, when loading the secure application 3111. Then the secure operation system 1042 loads the secret code or data in the secure application 3111 in the cache 1004, and loads the remaining data in the secure region 1040.

Figure 13:
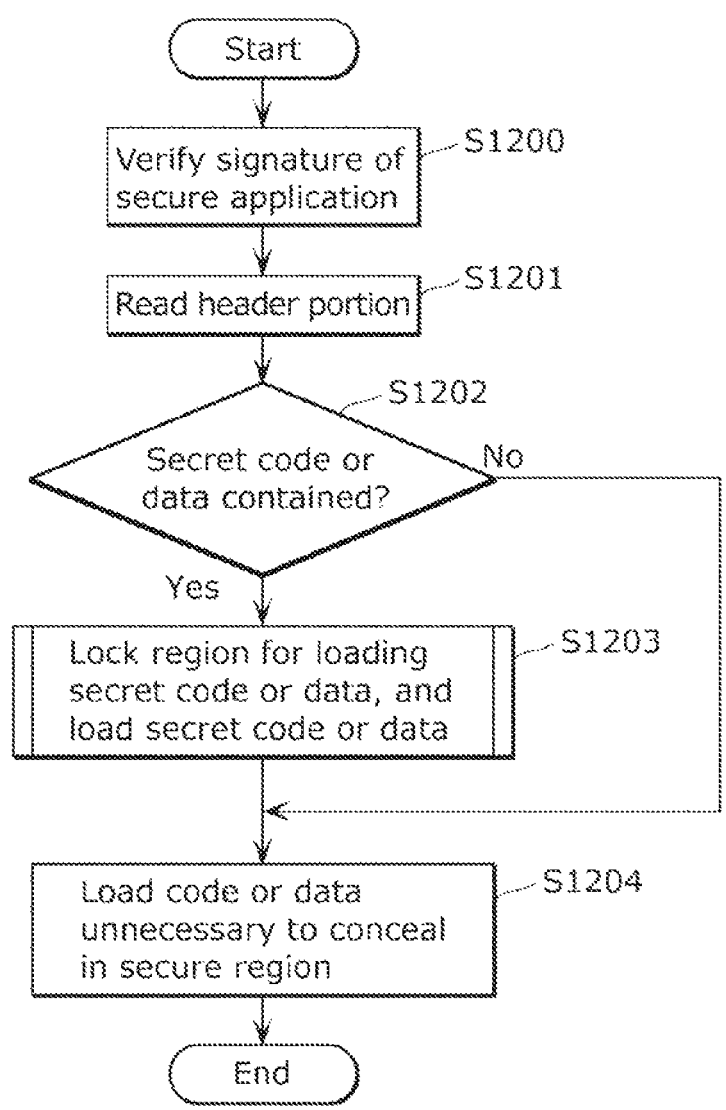
FIG. 13 is a flowchart showing a loading process of a secure application according to Embodiment 2.

Hereunder, the loading process of the secure application 3111 will be described referring to the flowchart shown in FIG. 13.

The secure operation system 1042 reads the secure application 3111 and verifies the signature 3206 (S1200). In the case where the secure operation system 1042 fails to verify the signature 3206, the secure operation system 1042 suspends the loading of the secure application 3111.

Upon successfully verifying the signature (S1200), the secure operation system 1042 reads the application header information 3201 of the secure application 3111 (S1201).

The secure operation system 1042 acquires, from the application header information 3201 read in, the flag indicating whether the application main body 3202 includes the secret code or data. The secure operation system 1042 then decides whether the application main body 3202 includes the secret code or data, according to the flag (S1202).

In the case where the secure operation system 1042 decides that the application main body 3202 includes the secret code or data (Yes at S1202), the secure operation system 1042 decrypts the header portion 3210 of the application main body 3202. Then the secure operation system 1042 calculates the size of the secret code or data to be concealed, and load the secret code or data (S1203). The loading process is the same as the sequence chart shown in FIG. 9, and therefore detailed description will not be repeated.

The secure operation system 1042 decrypts the secret code or data on the basis of the information of the start address and size of the respective sections included in the header portion 3210, and loads the secret code or data in the locked region in the cache 1004.

In the case where the secure operation system 1042 decides that the application main body 3202 does not include the secret code or data (No at S1202), the secure operation system 1042 decrypts the code or data unnecessary to conceal. Alternatively, the secure operation system 1042 decrypts the code or data unnecessary to conceal, after loading the secret code or data in the cache 1004 (S1203).

Then the secure operation system 1042 loads the decrypted code or data unnecessary to conceal in the secure region 1040 (S1204).

In this embodiment, the secure operation system 1042 is set to decide whether the application main body 3202 includes the secret code or data, and loads the secret code or data in the locked region in the cache 1004. However; the aforementioned process may be otherwise arranged.

For example, the secure operation system 1042 may regard all the data as the secret code or data, and load all the data in the locked region in the cache 1004 (S1203).

In this case, the secure operation system 1042 may read the header portion 3210 (S1201), and identify in which part of the locked region the secret code or data is loaded, on the basis of the information of the header portion 3210 (S1202). Then the secure operation system 1042 may unlock the region in the locked region where the secret code or data is not located.

As described above, in this embodiment the secret code or data may be located in the secure application 3111 such as the content playback application 1043. Such a configuration exempts the secure application 3111 from requesting the secure operation system 1042 to load the secret data 1010 on each occasion.

In addition, it is not necessary to incorporate the loading and unloading function of the secret data 1010 in the secure application 3111 as a program. Appropriately setting the section for the secret code or data enables the secure operation system 1042 to load the secret code or data in the appropriate region. Therefore, even when the loading destination is changed because of the hardware configuration, it is not necessary to modify the secure application 3111. Such an arrangement improves the transplantability of the secure application 3111.

Embodiment 3

In Embodiment 1, the secure operation system 1042 is set to load the secret data 1010 in the cache 1004 according to the request from the secure application 3111 such as the content playback application 1043. In Embodiment 2, the application main body 3202 of the secure application 3111 includes the portion to be loaded in the secure region 1040 and the portion to be loaded in the cache 1004, and those portions are individually loaded when the secure application 3111 is loaded.

In Embodiment 3, the secure operation system 1042 locks, when processing the secret data 1010, a stack region in the cache 1004 utilized by a function that processes the secret data 1010 and other data. Such an arrangement allows the secret data 1010 to be safely processed. In addition, the secure operation system 1042 unlocks the cache 1004 when the secret data 1010 is not involved in the process. Therefore, the utilization efficiency of the cache 1004 can be improved.

Hereunder, the locking and unlocking process of the cache 1004 according to this embodiment will be described. The same constituents and processes as those of Embodiment 1 will be given the same numeral and the description thereof will not be repeated.

[Locking of Cache 1004]

Even when the secure application 3111 loads the secret data 1010, which has to be protected from both an attack by hardware and an attack by software, in the locked region in the cache 1004, still the protection may be insufficient in a certain circumstance.

For example, in the case where the secret data 1010 is subjected to an arithmetic operation with a different value and the result thereof is overwritten on the region where the secret data 1010 is stored, it is unlikely that a problem will arise. However, a problem may arise in the case of storing the calculation result in a local variable located in the stack region in the memory 1020. This is because it may be possible to retrospectively obtain the original secret data 1010 from the calculation result.

Accordingly, the secure application 3111 locks the stack region in the cache 1004 when handling the secret data 1010, to thereby protect the secret data 1010 and the related data.

Figure 14A:
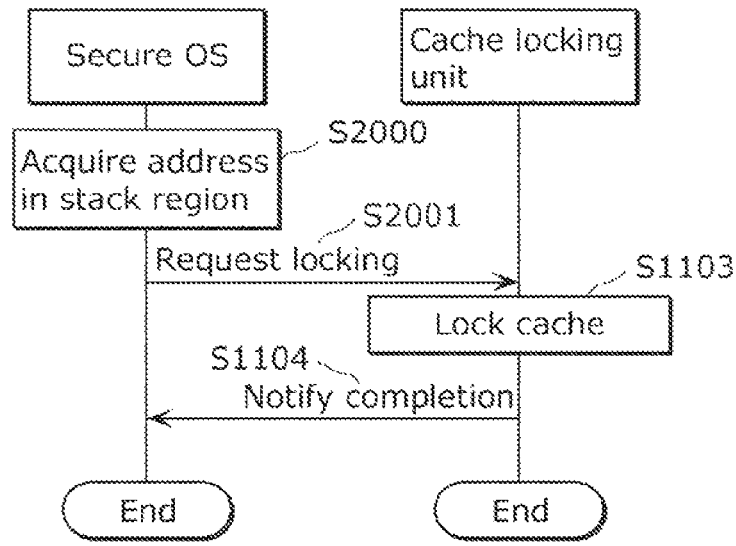
FIG. 14A is a sequence chart showing a locking process of a cache according to Embodiment 3.

Hereunder, the locking process of the stack region in the cache 1004 will be describe, referring to the sequence chart shown in FIG. 14A.

The secure operation system 1042 acquires the address used by the stack of the secure application 3111, according to a request therefrom (S2000).

The secure operation system 1042 notifies the information of the stack region (address and size) to the cache locking unit 1045, and requests to lock the cache 1004 (S2001).

The cache locking unit 1045 locks the stack region in the cache 1004, so as to prevent the data in the stack region from being excluded from the cache 1004 and written out into the memory 1020 outside of the system LSI 1000 (S1103). The locking operation itself is the same as that of Embodiment 1. In this embodiment, the stack region which is the object to be locked is read into the cache 1004 during the execution of the function. Therefore, the process of reading the data (S1102) may be skipped.

The cache locking unit 1045 notifies the secure operation system 1042 that the locking process has been completed (S1104).

The locking process is thus completed. Thereafter, the secure application 3111 performs an arithmetic operation with the secret data 1010, and stores the final result or a halfway result in the stack region.

Here, in the case where a new memory region is allocated as the stack region, the secure operation system 1042 decides whether the stack region of the secure application 3111 is locked in the cache 1004. In the case where the stack region is locked, the secure operation system 1042 also locks the additionally allocated region in the cache 1004.

In this embodiment, the secure operation system 1042 locks the stack region in the cache 1004 according to the request from the secure application 3111. However, the locking may be performed at a different time point. The secure operation system 1042 may lock, upon receipt of the loading request of the secret data 1010 from the secure application 3111, the stack region in the cache 1004 for the secure application 3111 which has made the loading request.

Alternatively, the secure operation system 1042 may lock the stack region in the cache 1004 for the secure application 3111 when the secure application 3111 accesses a predetermined specific region.

In this embodiment, the secure operation system 1042 locks the stack region in the cache 1004. However, the secure operation system 1042 may lock a different region. The secure operation system 1042 may lock a region where other data is stored. The region to be locked may be, for example, a region dynamically secured by a malloc function, or a region including a global variable accessible from a given function in the secure application 3111.

[Unlocking of Cache 1004]

The secure application 3111 erases the data related to the secret data 1010 in the stack region, upon finishing the process in which the secret data 1010 is involved. Then the secure application 3111 requests the secure operation system 1042 to unlock the stack region in the cache 1004. Upon receipt of such a request, the secure operation system 1042 unlocks the stack region in the cache 1004.

Such an operation allows the region thus far locked in the cache 1004 to be utilized by other programs or other data, thereby improving the utilization efficiency of the cache 1004.

Figure 14B:
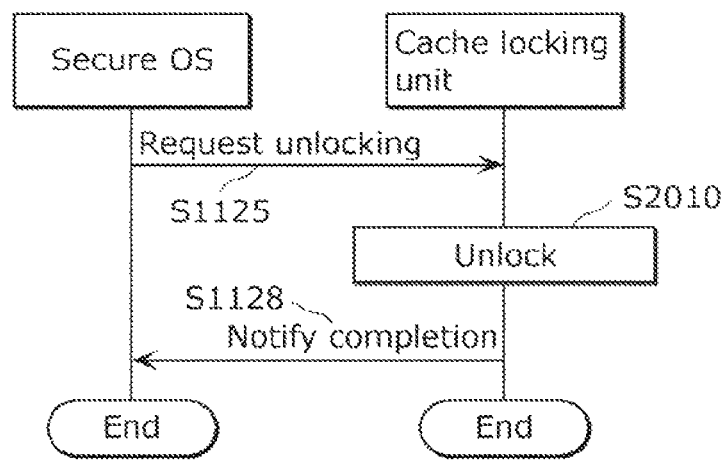
FIG. 14B is a sequence chart showing an unlocking process of the cache according to Embodiment 3.

Hereunder, the unlocking process of the stack region in the cache 1004 will be described, referring to the sequence chart shown in FIG. 14B.

The secure application 3111 requests the secure operation system 1042 to unlock the stack region in the cache 1004. Upon receipt of the request, the secure operation system 1042 requests the cache locking unit 1045 to unlock the stack region that has been locked in the cache 1004 (S1125).

The cache locking unit 1045 unlocks the stack region that has been locked in the cache 1004 cache 1004 (S2010). Then the cache locking unit 1045 notifies the secure operation system 1042 that the unlocking has been completed (S1128).

The unlocking process is thus completed. Thereafter, the secure application 3111 normally operates, so that the data in the stack region is read into the cache 1004, and the data in the cache 1004 is written out into the memory 1020. Thus, the cache 1004 can be efficiently utilized.

In this embodiment, as described above, the stack region where the data is stored is locked and unlocked in the cache 1004 during the execution of the program. Therefore, not only the secret data 1010 itself, but also the data generated by the program that processes the secret data 1010 and the calculation result based on the secret data 1010 can be protected.

Embodiment 4

The information processing apparatus according to this embodiment includes the distinctive constituents of the content display apparatus 110 according to Embodiments 1 to 3.

Figure 15A:
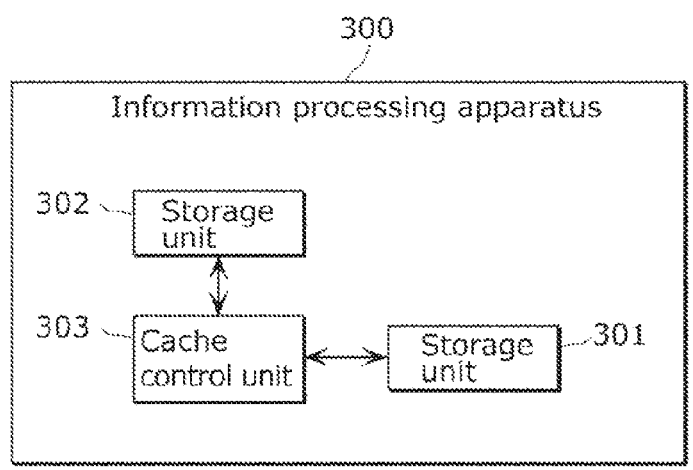
FIG. 15A is a black diagram showing a hardware configuration of an information processing apparatus according to Embodiment 4.

FIG. 15A is a block diagram showing a hardware configuration of the information processing apparatus according to this embodiment. The information processing apparatus 300 shown in FIG. 15A is intended to process data to be protected. The information processing apparatus 300 includes a pair of storage units 301, 302, and a cache control unit 303.

The storage unit 301 corresponds to the memory 1020 shown in FIG. 2. The storage unit 302 corresponds to the storage 1011 shown in FIG. 3. The cache control unit 303 corresponds to the cache control unit 1012 shown in FIG. 3.

Figure 15B:
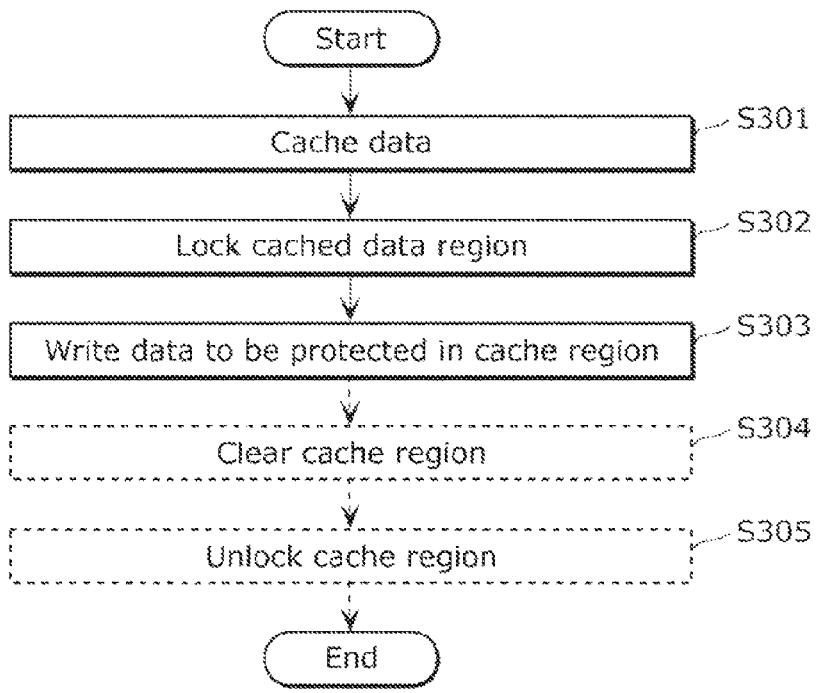
FIG. 15B is a flowchart showing an operation of the information processing apparatus according to Embodiment 4.

FIG. 15B is a flowchart showing the operation of the information processing apparatus 300 shown in FIG. 15A. First, the cache control unit 303 caches stored data in the storage unit 301, in the storage unit 302 (S301).

Then the cache control unit 303 locks the cache region in the storage unit 302, so as to prevent the cache data, obtainable from the cache region in the storage unit 302 where the stared data is cached, from being written back into the storage unit 301 (S302). After the cache region in the storage unit 302 is locked, the cache control unit 303 writes data to be protected, which is different from the stored data, in the cache region in the storage unit 302 (S303).

The data to be protected is thus written in the cache (storage unit 302). In this case, it is difficult for an external apparatus to access the data written in the cache. Therefore, the data to be protected can be effectively protected.

The cache control unit 303 clears the cache region in the storage unit 302 after the data to be protected is processed (S304). Then the cache control unit 303 unlocks the cache region so as to allow the cache data obtainable from the cleared cache region to be written back into the storage unit 301 (S305). With such an arrangement, the data to be protected is erased before being written back into the memory from the cache. Accordingly, the data to be protected can be effectively protected.

Here, the cache control unit 303 may allocate the data region for the data to be protected in the storage unit 301, before the data to be protected is processed. In this case, the cache control unit 303 may cache the stored data in the allocated data region into the storage unit 302 (S301). In this case, the data region for the data to be protected is allocated in the memory (storage unit 301) such as an SDRAM. Accordingly, appropriate correspondence can be maintained between the region in the memory and the cache region.

The steps after the data to be protected is processed (S304, S305) may be skipped. The data to be protected can be effectively protected, provided that the data is prevented from being written back.

The cache control unit 303 may write the data to be protected in the cache region of the storage unit 302, through a circuit physically protected so as to restrict an external apparatus from acquiring the data to be protected outputted from a processor. In addition, the storage unit 302 may be physically protected so as to restrict an external apparatus from acquiring the data to be protected written in the cache region.

To restrict an external apparatus from acquiring the data to be protected, for example a single integrated circuit may include the processor, the storage unit 302, and the circuit between the processor and the storage unit 302. Such a configuration makes it physically difficult for an external apparatus to acquire the data to be protected. Therefore, the data to be protected can be effectively protected.

In addition, the cache control unit 303 may write, in the cache region in the storage unit 302, the data to be protected scheduled by a program to be written in the storage unit 301. In this case, the data to be protected to be written in the memory by the program is written in the cache instead of in the memory. Accordingly, the data to be protected can be effectively protected.

Further the cache control unit 303 may write an executable program in the cache region in the storage unit 302, as the data to be protected. Such an arrangement protects the program to be protected from falsification, thereby allowing the program to be properly executed.

Embodiment 5

The information processing apparatus according to this embodiment includes the distinctive constituents of the content display apparatus 110 according to Embodiments 1 to 3. Further, constituents that can be optionally added will be described in this embodiment, in addition to the constituents referred to in Embodiment 4.

Figure 16:
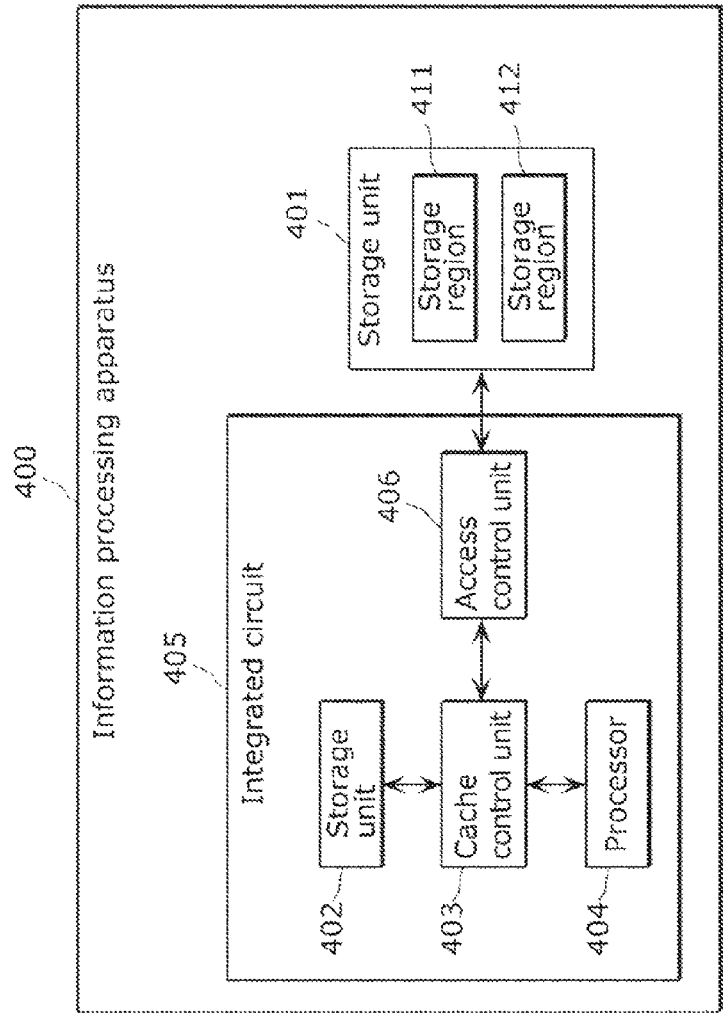
FIG. 16 is a block diagram showing a hardware configuration of an information processing apparatus according to Embodiment 5.

FIG. 16 is a block diagram showing a hardware configuration of an information processing apparatus according to this embodiment. The information processing apparatus 400 shown in FIG. 6 is intended to process data to be protected. The information processing apparatus 400 includes a storage unit 401 and an integrated circuit 405.

The storage unit 401 corresponds to the memory 1020 shown in FIG. 2 and the storage unit 301 shown in FIG. 15A. The storage unit 401 includes a pair of storage regions 411, 412. The storage region 411 corresponds to the normal region 1030 shown in FIG. 2, and the storage region 412 corresponds to the secure region 1040 shown in FIG. 2. The storage region 411 serves for storing normal programs. The storage region 412 serves for storing secure programs, and the normal programs are not permitted to access the storage region 412.

The integrated circuit 405 corresponds to the system LSI 1000 shown in FIG. 2. The integrated circuit 405 includes a storage unit 402, a cache control unit 403, a processor 404, and an access control unit 406.

The storage unit 402 corresponds to the storage 1011 shown in FIG. 3 and the storage unit 302 shown in FIG. 15A. The cache control unit 403 corresponds to the cache control unit 1012 shown in FIG. 3 and the cache control unit 303 shown in FIG. 15A. The processor 404 corresponds to the CPU 1001 shown in FIG. 2. The access control unit 406 corresponds to the memory control unit 1003 shown in FIG. 2.

The storage unit 402, the cache control unit 403, and the processor 404 are included in the integrated circuit 405. It is difficult for an external apparatus to access the data inside the integrated circuit 405. Therefore, the data to be protected can be effectively protected.

The processor 404 may generate the data to be protected and output the generated data to be protected. The cache control unit 403 may write the data to be protected outputted from the processor 404 in the cache region in the storage unit 402, after the cache region in the storage unit 402 is locked. Thus, the data to be protected generated by the processor 404 is written in the cache. Therefore, the data to be protected generated by the processor 404 can be effectively protected.

For example, the processor 404 may generate the data to be protected by decrypting encrypted data, and output the data to be protected thus generated. In this case, the data to be protected obtained by decrypting the encrypted data can be effectively protected.

The processor 404 may execute the secure program in the secure mode, and the normal program in the normal mode. In this case, the program can be executed at the appropriate security level, and access control can be performed on the basis of the security level corresponding to the program.

In addition, the cache control unit 403 may write, in the cache region in the storage unit 402, the data to be protected scheduled by a secure program to be written in the storage region 412. In this case, the data to be protected to be written in the memory by the secure program is written in the cache instead of in the memory. Accordingly, the data to be protected can be protected at a higher security level.

The access control unit 406 may inhibit the normal program from accessing the storage region 412. Such an arrangement enables the access to the respective storage regions 411, 412 to be properly controlled. Therefore, execution of an illegitimate program can be effectively restricted.

[Variations]

The information processing apparatus according to the present invention is not limited to Embodiments 1 to 5. The information processing apparatus may be configured as the variations given hereunder.

(1) In the aforementioned embodiments, the programs stored in the secure region 1040, namely the encrypted boot loader 1052, the encrypted secure operation system 1053, and the encrypted content playback application 1054, are individually stored in the non-volatile storage device 1050. However, the programs may be stored differently.

The programs may be stored in the secure region 1040 in a group. More specifically, the boot loader 1041, the secure operation system 1042, and the content playback application 1043 may be grouped in a single file and encrypted, and thus stored in the non-volatile storage device 1050.

Figure 8:
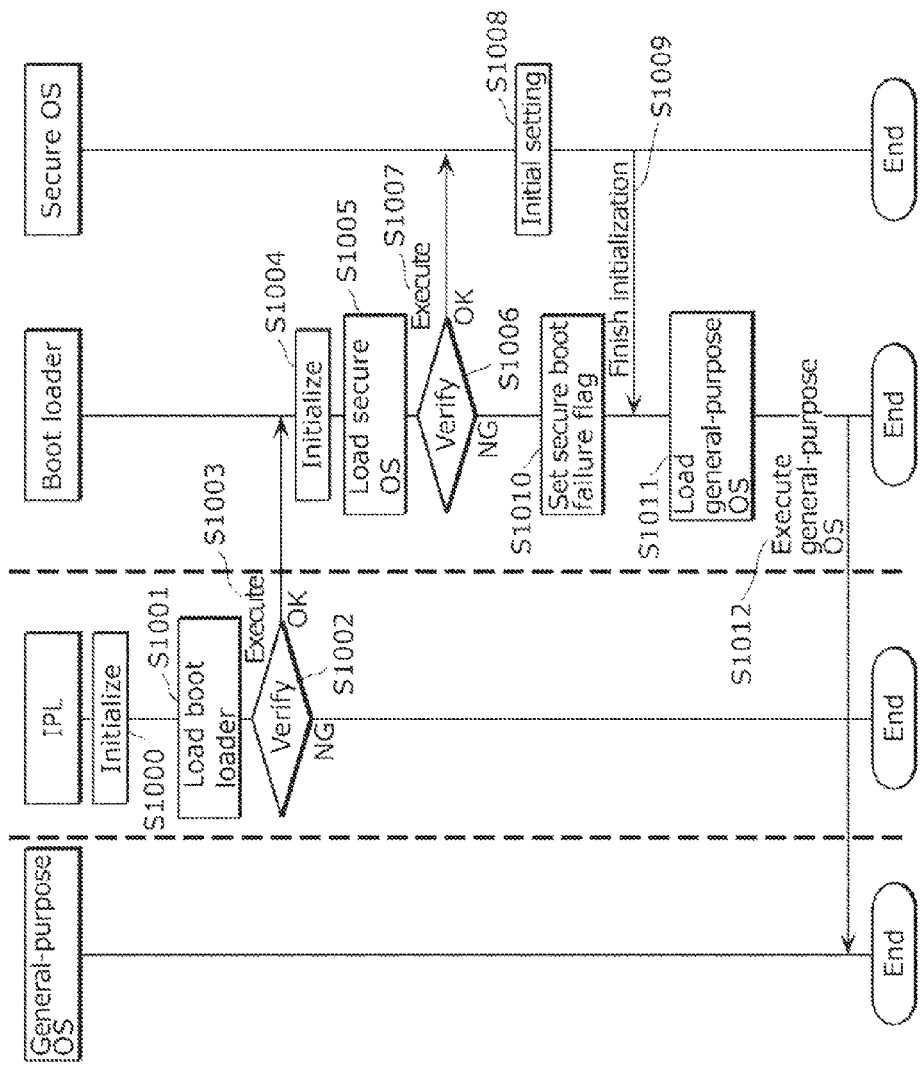
FIG. 8 is a sequence chart showing a secure boot process according to Embodiment 1.

In the case where the programs stored in the secure region 1040 are grouped in a single file, the IPL 1002 may load and verify the entirety of the file when loading and verifying the boot loader 1041 (S1001 and S1002 in FIG. 8). In this case, the boot loader 1041 is exempted from loading and verifying the secure operation system 1042 (S1005 and S1006 in FIG. 8).

It is not mandatory that all the programs be grouped in a single file. For example, the boot loader 1041 and the secure operation system 1042 may be grouped in a file, and all other secure applications may be grouped in another single file. Alternatively, the boot loader 1041 may be constituted as a single file, and the secure operation system 1042 and all other secure applications may be grouped in another single file. Naturally, the programs may be grouped differently.

In the case where the secure operation system 1042 and all other secure applications are grouped in a single file, the secure operation system 1042 does not have to load the secure applications in the secure region 1040. Accordingly, the function to load the secure applications in the secure region 1040 may be excluded from the secure operation system 1042.

(2) In the unloading process of the secret data 1010 according to the aforementioned embodiments, the zero value is overwritten on the secret data 1010 before the cache 1004 is unlocked. However, different procedures may be adopted. A different value, instead of the zero value, may be overwritten on the secret data 1010. In addition, it is not mandatory that the same value be overwritten on the secret data 1010. In other words, a plurality of values may be overwritten on the secret data 1010.

Further, the Dirty flag to be set when the data in the cache 1004 is rewritten, of the Valid flag indicating that valid data is stored in the cache 1004 may be cleared. Such an arrangement prevents the secret data 1010 from being written out into the memory 1020. In this case, it is not necessary to use a predetermined value to overwrite the secret data 1010.

(3) in the aforementioned embodiments, the secret data 1010 is loaded in the cache 1004 inside the system LSI 1000. However, the secret data 1010 may be loaded outside of the system LSI 1000. For example, the secret data 1010 may be loaded in a memory provided outside the system LSI 1000 and protected from an attack by hardware such as a bus probe.

The memory protected from an attack by hardware such as a bus probe can be installed in various methods. For example, the system LSI 1000, a signal line between the system LSI 1000 and the memory, and the terminal of the memory may be buried inside the substrate. Alternatively, an adhesive may be applied to the signal line and the terminal. In this case, when the adhesive is removed the signal line or the terminal is broken. Further, the system LSI 1000 and the memory may be encapsulated in the same package.

Figure 17:
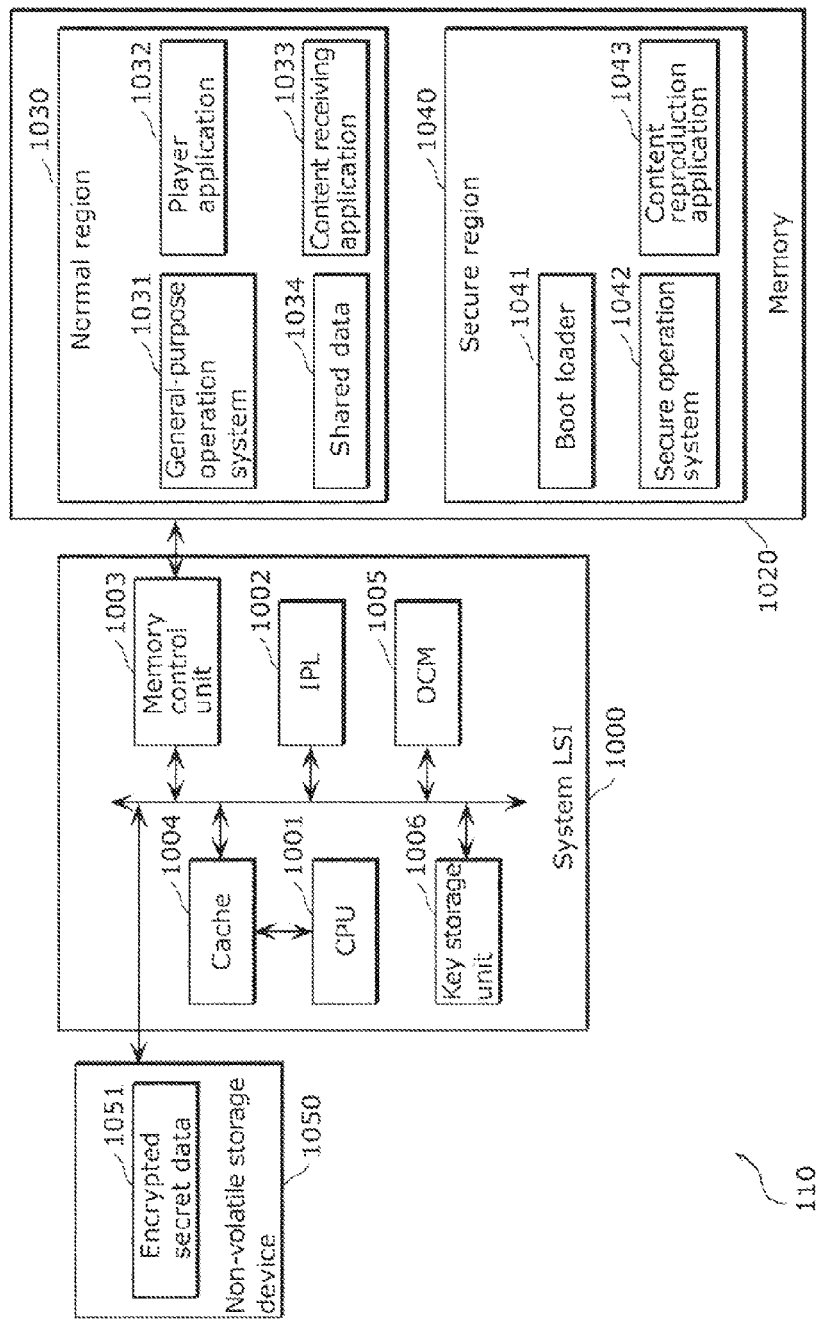
FIG. 17 is a block diagram showing a hardware configuration of a content display apparatus according to a variation of the embodiments.

Alternatively, as shown in FIG. 17, the secret data 1010 may be loaded in an on-chip memory (OCM) 1005 provided inside the system LSI 1000.

(4) In one of the aforementioned embodiments, the secure operation system 1042 includes the secret data loading unit 1044 and the cache locking unit 1045. In another embodiment, the secure operation system 1042 includes the secret data loading unit 1044, the cache locking unit 1045, and the application loading unit 1046. However, the secure operation system 1042 may have different configurations. It is not mandatory that all those constituents be included in the secure operation system 1042.

Figure 18:
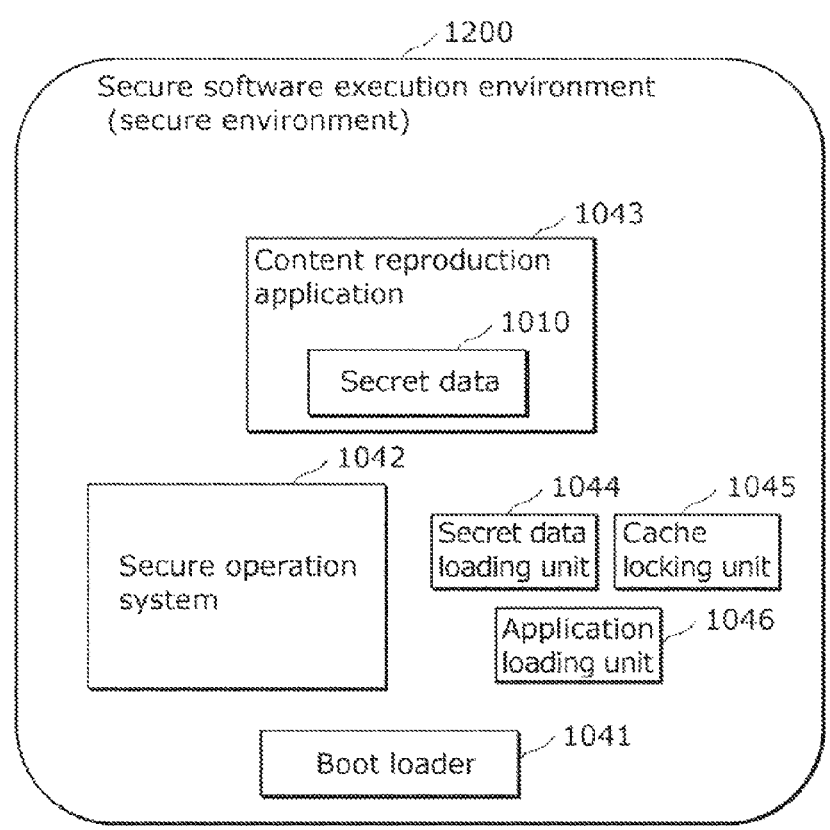
FIG. 18 is a block diagram showing a secured software execution environment according to another variation.

For example, those constituents may be formed as a loadable module that can be subsequently loaded in the secure operation system 1042, or a device driver. Alternatively, those constituents may be formed as firmware independent of the secure operation system 1042, as shown in FIG. 18.

The aforementioned constituents may be included in the boot loader 1041 instead of in the secure operation system 1042, or in both of the secure operation system 1042 and the boot loader 1041. Whichever configuration may be adopted, the secret data loading unit 1044, the cache locking unit 1045, and the application loading unit 1046 are operable when the CPU 1001 is operating in the secure mode and in the privilege mode.

(5) The aforementioned apparatuses may actually be constituted as a computer system including a microprocessor, a ROM, a RAM, a hard disk unit, a display unit, a keyboard, a mouse, and so forth.

More specifically, the RAM or the hard disk unit stores a computer program. By operation of the microprocessor in accordance with the computer program, the functional units perform the respective functions. Here, the computer program is constituted of combinations of a plurality of command codes indicating instructions to the computer, arranged for performing the predetermined functions.

(6) A part or whole of the functional units of the aforementioned apparatuses may be constituted of a single system LSI. The system LSI is an ultra-multifunctional LSI manufactured by stacking a plurality of components on a single chip, and is actually a computer system including a microprocessor, a ROM, a RAM and so forth. The RAM stores a computer program. By operation of the microprocessor in accordance with the computer program, the system LSI performs its functions.

The functional units of the aforementioned apparatuses may be individually implemented in separate chips, or a single chip may include a part or whole of the functional units.

Although the term of system LSI is adopted above, the device may be named as an integrated circuit (IC), an LSI, a super LSI, or an ultra LSI, depending on the level of integration.

The integration may be achieved by an exclusive circuit or a general-use processor, instead of employing the LSI. After manufacturing the LSI, a field programmable oate array (FPGA), or a reconfigurable processor that accepts reconfiguration of connection or setting of circuit cells inside the LSI may be employed.

Further, in the case where an integration technique that can be substituted for the LSI is developed through advancement of semiconductor technology or another technique deriving therefrom, naturally such new technique may be introduced for integrating the functional units. An example of such possibility is application of biochemical technology.

(7) A part or whole of the functional units of the aforementioned apparatuses may be constituted of an IC card or a single-piece module that can be removably attached to the apparatuses. The IC card or the module is a computer system including a microprocessor, a ROM, a RAM, and so forth.

The IC card or the module may include the ultra-multifunctional LSI referred to above. By operation of the microprocessor in accordance with the computer program, the IC card or the module performs its functions. The IC card or the module may be given tamper resistance.

(8) The concept of the present invention may be realized as methods cited in the aforementioned embodiments and variations. Alternatively, the concept of the present invention may be realized as a computer program for executing the methods, or as digital signals constituting the computer program.

In addition, the present invention may be realized as a non-transitory computer-readable recording medium having a computer program or digital signals recorded thereon. Examples of such a recording medium include a flexible disk, a hard disk, a CD-ROM, an MO, a DVD, a DVD-ROM, a DVD-RAM, a Blu-ray Disc (registered trademark) (BD), or a semiconductor memory. Further, the concept of the present invention may be realized as the computer program or the digital signals stored in such recording media.

The computer program or the digital signals may be transmitted through an electrical communication line, a wired or wireless communication line, a communication network typically exemplified by the Internet, data broadcasting, and so forth.

The concept of the present invention may be realized as a computer system including a microprocessor and a memory. The memory may store a computer program, and the microprocessor may operate in accordance with the computer program.

Further, the program or the digital signals may be recorded in a recording medium and transferred, or transferred through the network and so on so that the concept of the present invention may be executed by another independent computer system.

(9) The aforementioned embodiments and variations may be combined. An operation performed by a constituent may be performed by another constituent. The order of operations may be modified, and a plurality of operations may be performed in parallel.

[Addendum]

The constituents cited in the aforementioned embodiments may be realized as an exclusive hardware, or by execution of an appropriate software program. Those constituents may be realized as a program execution unit such as a CPU or a processor, configured to read out a software program recorded on a recording medium such as a hard disk or a semiconductor memory and to execute that program. Here, the software that realizes the information processing apparatus according to the aforementioned embodiments may be the following program.

The program may represent an information processing method, to be performed by a computer to process data to be protected, and the method may include caching stored data in the first storage unit into a second storage unit, locking a cache region in the second storage unit to thereby restrict cache data of the stored data from being written back in the first storage unit, the cache data being obtainable from the cache region in the second storage unit where the stored data is cached, and writing the data to be protected different from the stored data in the cache region in the second storage unit, after the cache region in the second storage unit is locked.

Throughout the foregoing passages, the embodiments of the information processing apparatus have been described. However, it is to be understood that the present invention is in no way limited to those embodiments. Various modifications of the embodiments that may be reached by those skilled in the art within the scope of the present invention, as well as combinations of the constituents of the different embodiments are duly included in the present invention.

The information processing apparatus according to the present invention is useful for handling secret data to be concealed, and advantageously applicable to information processing apparatuses such as a mobile phone, a personal computer, and the like, designed to execute software for playing back content for which the copyright is protected.

REFERENCE SIGNS LIST

100 Content distribution system
110 Content display apparatus
120 Content recording apparatus
121 Antenna
300, 400 Information processing apparatus
301, 302, 401, 402 Storage unit
303, 403, 1012 Cache control unit (cache DMA controller)
404 Processor
405 integrated circuit
406 Access control unit
411, 412 Storage region
1000 System LSI
1001 CPU
1002 IPL
1003 Memory controller unit (memory controller)
1004 Cache
1005 CCM
1006 Key storage unit
1010 Secret data
1011 Storage
1020 Memory
1030 Normal region
1031 General-purpose operation system (general-purpose OS)
1032 Player application
1033 Content receiving application
1034 Shared data
1040 Secure region
1041 Boot loader
1042 Secure operation system (secure OS)
1043 Content playback application
1044 Secret data loading unit
1045 Cache locking unit
1046 Application loading unit
1050 Non-volatile storage device 1051 Encrypted secret data
1052 Encrypted boot loader
1053 Encrypted secure operation system
1054 Encrypted content playback application
1061 Header information
1062 Secret data main body
1063 Verification value
1100 Normal software execution environment (normal environment)
1200 Secure software execution environment (secure environment)
3000 Package generation unit
3100 Compiler
3101 Linker
3102 Package generation tool
3110 Source code (program source code)
3111 Secure application
3112 Private key
3113, 3205 Public key certificate
3114, 3203 Setting file
3201 Application header information
3202 Application main body
3204 Application signature list
3206 Signature
3210 Header portion
3211 .text section
3212 .hctext section
3213 .rodata section
3214 .data section
3215 .bss section
3216 .hcdata section

The invention claimed is:

1. An information processing apparatus that performs predetermined processing on data to be protected, the information processing apparatus comprising:
   a first storage unit;
   a second storage unit;
   a cache control unit configured to cache data stored in the first storage unit into the second storage unit;
   a cache locking unit configured to instruct the cache control unit to lock a cache region in the second storage unit; and
   a secret data loading unit configured to load the data to be protected in one of the first storage unit and the second storage unit,
   wherein the cache control unit is configured to lock the cache region in the second storage unit to thereby prevent cache data of the stored data from being written back into the first storage unit, the cache data being obtainable from the cache region in the second storage unit in which the stored data is cached,
   the cache locking unit is configured to:
   read data which is different from the data to be protected and is already stored in a region into which the data to be protected is scheduled to be stored; and
   instruct the cache control unit to lock the cache region in the second storage unit, and
   the secret data loading unit is configured to write the data to be protected into the cache region in the second storage unit, after the cache region in the second storage unit is locked.

2. The information processing apparatus according to claim 1,
   wherein the cache control unit is configured to write the data to be protected outputted from a processor in the cache region of the second storage unit, through a circuit physically protected to restrict an external apparatus from acquiring the data to be protected outputted from the processor, and
   the second storage unit is physically protected to restrict an external apparatus from acquiring the data to be protected written in the cache region.

3. The information processing apparatus according to claim 1,
   wherein the cache control unit is configured to, when the predetermined processing is performed on the data to be protected:
   allocate a data region in the first storage unit to the data to be protected;
   cache the stored data in the allocated data region in the second storage unit;
   lock the cache region in the second storage unit, to thereby prevent the cache data of the stored data from being written back into the first storage unit, the cache data being obtainable from the cache region in the second storage unit in which the stored data is cached; and
   write the data to be protected into the cache region in the second storage unit, after the cache region in the second storage unit is locked.

4. The information processing apparatus according to claim 1,
   wherein the cache control unit is configured to unlock the cache region in the second storage unit so as to allow the cache data obtainable from the cache region in the second storage unit to be written back in the first storage unit, and
   the cache locking unit is configured to:
   clear the cache region in the second storage unit after the predetermined processing is performed on the data to be protected; and
   instruct the cache control unit to unlock the cache region in the second storage unit.

5. The information processing apparatus according to claim 1, further comprising
   a processor that executes a program for performing the predetermined processing on the data to be protected,
   wherein the cache locking unit is configured to, upon receiving an instruction from the program, read the data which is different from the data to be protected and is already stored in the region into which the data to be protected is scheduled to be stored, and instruct the cache control unit to lock the cache region in the second storage unit, and
   the secret data loading unit is configured to, upon receiving an instruction from the program, write the data to be protected in the cache region in the second storage unit, after the cache region in the second storage unit is locked.

6. The information processing apparatus according to claim 5, further comprising
   an integrated circuit,
   wherein the second storage unit, the cache control unit, and the processor are included in the integrated circuit.

7. The information processing apparatus according to claim 5,
   wherein the program further generates the data to be protected by decrypting encrypted data, and performs the predetermined processing on the generated data to be protected.

8. The information processing apparatus according to claim 7,
   wherein, prior to decrypting the encrypted data, the program, using the cache locking unit, reads the data which is different from the data to be protected and is already stored in the region into which the data to be protected is scheduled to be stored, and instructs the cache control unit to lock the cache region in the second storage unit.

9. The information processing apparatus according to claim 5,
wherein the processor executes a secure program in a secure mode and a normal program in a normal mode, and
the first storage unit includes:
a first storage region in which the normal program is to be stored; and
a second storage region in which the secure program is to be stored and an access to which by the normal program is restricted.

10. The information processing apparatus according to claim 9,
wherein the cache control unit is configured to write, in the cache region in the second storage unit, the data to be protected scheduled by the secure program to be written in the second storage region.

11. The information processing apparatus according to claim 9, further comprising
an access control unit configured to restrict the normal program from accessing the second storage region.

12. The information processing apparatus according to claim 1,
wherein the cache control unit is configured to write, in the cache region in the second storage unit, the data to be protected scheduled by a program to be written in the first storage unit.

13. The information processing apparatus according to claim 1,
wherein the cache control unit is configured to write an executable program in the cache region in the second storage unit, as the data to be protected.

14. The information processing apparatus according to claim 1, further comprising
a processor that executes a program for performing the predetermined processing on the data to be protected,
wherein the cache locking unit is configured to:
clear the cache region in the second storage unit, upon receiving an instruction from the program after the predetermined processing ends; and
instruct the cache control unit to unlock the cache region in the second storage unit.

15. The information processing apparatus according to claim 1, further comprising
a processor that executes a program for performing the predetermined processing on the data to be protected,
wherein the cache locking unit is configured to:
clear the cache region in the second storage unit, when the program for performing the predetermined processing ends; and
instruct the cache control unit to unlock the cache region in the second storage unit.

16. An information processing method for performing predetermined processing on data to be protected, the method comprising:
caching data stored in a first storage unit into a second storage unit;
instructing locking of a cache region in the second storage unit; and
loading the data to be protected in one of the first storage unit and the second storage unit,
wherein in the caching, the cache region in the second storage unit is locked to thereby prevent cache data of the stored data from being written back into the first storage unit, the cache data being obtainable from the cache region in the second storage unit in which the stored data is cached,
in the instructing, data which is different from the data to be protected and is already stored in a region into which the data to be protected is scheduled to be stored is read, and locking of the cache region in the second storage unit is instructed to be performed, and
in the loading, the data to be protected is written into the cache region in the second storage unit, after the cache region in the second storage unit is locked.

17. A non-transitory computer-readable recording medium for use in a computer, the recording medium having a computer program recorded thereon for causing the computer to execute the information processing method according to claim 16.

18. An integrated circuit that performs predetermined processing on data to be protected, the integrated circuit comprising:
a storage unit;
a cache control unit configured to cache data stored in a storage device into the storage unit;
a cache locking unit configured to instruct the cache control unit to lock a cache region in the storage unit; and
a secret data loading unit configured to load the data to be protected in one of the storage device and the storage unit,
wherein the cache control unit is configured to lock the cache region in the storage unit to thereby prevent cache data of the stored data from being written back into the storage device, the cache data being obtainable from the cache region in the storage unit in which the stored data is cached,
the cache locking unit is configured to:
read data which is different from the data to be protected and is already stored in a region into which the data to be protected is scheduled to be stored; and
instruct the cache control unit to lock the cache region in the storage unit, and
the secret data loading unit is configured to write the data to be protected into the cache region in the storage unit, after the cache region in the storage unit is locked.

* * * * *